US009046417B2

(12) United States Patent
Matsudo et al.

(10) Patent No.: US 9,046,417 B2
(45) Date of Patent: Jun. 2, 2015

(54) TEMPERATURE MEASURING SYSTEM, SUBSTRATE PROCESSING APPARATUS AND TEMPERATURE MEASURING METHOD

(75) Inventors: Tatsuo Matsudo, Nirasaki (JP); Kenji Nagai, Kurokawa-gun (JP)

(73) Assignee: TOKYO ELECTRON LIMITED (JP)

( * ) Notice: Subject to any disclaimer, the term of this patent is extended or adjusted under 35 U.S.C. 154(b) by 296 days.

(21) Appl. No.: 13/529,391

(22) Filed: Jun. 21, 2012

(65) Prior Publication Data

US 2012/0327394 A1 Dec. 27, 2012

Related U.S. Application Data

(60) Provisional application No. 61/523,447, filed on Aug. 15, 2011, provisional application No. 61/557,958, filed on Nov. 10, 2011.

(30) Foreign Application Priority Data

Jun. 24, 2011 (JP) .................................. 2011-140642
Oct. 31, 2011 (JP) .................................. 2011-239002

(51) Int. Cl.
*G01J 3/45* (2006.01)
*G01J 5/08* (2006.01)
*G01J 5/00* (2006.01)

(52) U.S. Cl.
CPC ............. *G01J 5/0896* (2013.01); *G01J 5/0007* (2013.01)

(58) Field of Classification Search
CPC .................................. G01J 5/00; G01J 5/0007
USPC ............................................ 356/43, 303, 451
See application file for complete search history.

(56) References Cited

U.S. PATENT DOCUMENTS

| 5,208,643 | A | * | 5/1993 | Fair .................................. 356/43 |
| 7,099,015 | B2 | * | 8/2006 | Melnyk ......................... 356/480 |
| 7,728,984 | B2 | * | 6/2010 | Waegli et al. .................. 356/480 |
| 2005/0151975 | A1 | * | 7/2005 | Melnyk ......................... 356/480 |

FOREIGN PATENT DOCUMENTS

JP          2006220461         8/2006

* cited by examiner

*Primary Examiner* — Jonathan Hansen
(74) *Attorney, Agent, or Firm* — Cantor Colburn LLP

(57) ABSTRACT

The temperature measuring system using optical interference includes a light source which generates measuring light; a spectroscope which measures an interference intensity distribution that is an intensity distribution of reflected light; optical transfer mechanisms which emit light reflected from a surface and a rear surface of the object to be measured to the spectroscope; an optical path length calculation unit which calculates an optical path length by performing Fourier transformation; and a temperature calculation unit which calculates a temperature of the object to be measured on the basis of a relation between optical path lengths and temperatures. The light source has a half-width at half-maximum of a light source spectrum that satisfies conditions based on a wavelength span of the spectroscope. The spectroscope measures the intensity distribution by using the number of samplings that satisfies conditions based on the wavelength span and a maximum measurable thickness.

7 Claims, 21 Drawing Sheets

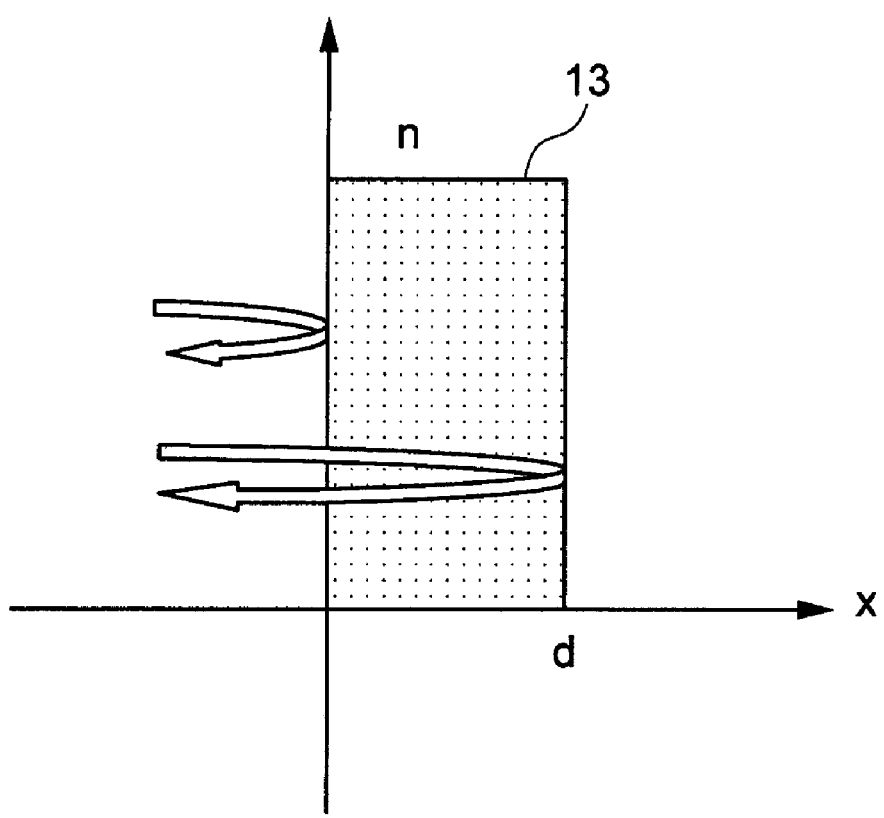

TEMPERATURE MEASURING SYSTEM, SUBSTRATE PROCESSING APPARATUS AND TEMPERATURE MEASURING METHOD

CROSS-REFERENCE TO RELATED PATENT APPLICATIONS

This application claims the benefit of Japanese Patent Application No. 2011-140642, filed on Jun. 24, 2011, and Japanese Patent Application No. 2011-239002, filed on Oct. 31, 2011, in the Japanese Patent Office, and U.S. Patent Application No. 61/523,447, filed on Aug. 15, 2011 and U.S. Patent Application No. 61/557,958, filed on Nov. 10, 2011, in the U.S. Patent and Trademark Office, the disclosures of which are incorporated herein in their entirety by reference.

BACKGROUND OF THE INVENTION

1. Field of the Invention

The present invention relates to a temperature measuring system, a substrate processing apparatus, and a temperature measuring method.

2. Description of the Related Art

Patent Reference 1 discloses a kind of temperature measuring system. The temperature measuring system disclosed in Patent Reference 1 includes a light source, a splitter, a mirror, a driving unit, and a light receiving unit. Light emitted from the light source is split into measuring light and reference light by the splitter. The measuring light is reflected respectively by opposite end surfaces of an object to be measured, and then reaches the light receiving unit via the splitter. Meanwhile, the reference light is reflected by the mirror, and reaches the light receiving unit via the splitter. The mirror is moved by the driving unit, and when a distance from the splitter to the mirror becomes the same as a distance from the splitter to an end surface of the object to be measured, interference peaks occur. A distance between two interference peaks becomes a length of an optical path between the opposite end surfaces of the object to be measured. A temperature of the object to be measured may be measured from the obtained optical path length.

When measuring the temperature, it is desirable that the temperature is measured with high sampling rate. However, according to the above described apparatus, a sampling rate is dependent upon a driving time of the mirror, and thus, in order to obtain the high sampling rate, a driving unit of the mirror has to be driven at a high speed. Meanwhile, in order to realize the high sampling rate, a method of defining a thickness of an object to be measured based on intensities of light reflected by a surface and a rear surface of the object to be measured can be suggested. However, in order to detect temperature variation appropriately by using the above method, a thickness has to be measured with high accuracy.

Thus, in the present technology field, a temperature measuring apparatus capable of measuring a temperature of an object to be measured appropriately by using optical interference, a substrate processing apparatus, and a temperature measuring method are necessary.

3. Prior Art Reference (Patent Reference 1) Japanese Laid-open Patent Publication No. 2006-220461

SUMMARY OF THE INVENTION

According to an aspect of the present invention, a temperature measuring system using an optical interference includes a light source, a spectroscope, an optical transfer mechanism, an optical path calculation unit, and a temperature calculation unit. The light source generates measuring light having a wavelength transmittable through the object to be measured. The optical transfer mechanism emits measuring light from the light source to a first main surface of the object to be measured. The optical transfer mechanism emits light reflected from a first main surface and a second main surface of the object to be measured to the spectroscope. The spectroscope measures an interference intensity distribution that is an intensity distribution of the reflected light representing an intensity distribution depending on a wavelength or frequency. The optical path length calculation unit calculates an optical path length by Fourier transforming the interference intensity distribution that is an intensity distribution of light reflected from the first main surface and the second main surface. The temperature calculation unit calculates a temperature of the object to be measured based on the calculated optical path length and a relation between optical path lengths and temperatures of the object to be measured, which are measured in advance. The light source has a half-width at half-maximum of a light source spectrum that satisfies conditions based on a wavelength span of the spectroscope. The spectroscope measures the intensity distribution by using the number of samplings that satisfies conditions based on the wavelength span of the spectroscope and a maximum measurable thickness of the object to be measured by the temperature measuring system.

In order to measure a thickness with high accuracy, specifications of elements have to be appropriately set. In the temperature measuring system, a wavelength span of the spectroscope is not infinite, but finite, that is, a data interval after the Fourier transformation and a maximum measurable thickness are defined, and thus, the light source and the spectroscope have specifications required to measure the temperature at a desired accuracy. That is, by preparing the light source satisfying conditions based on the wavelength span and the spectroscope satisfying conditions based on the wavelength span and the maximum measurable thickness, the temperature may be measured appropriately by using the optical interference.

The wavelength span may be defined based on a dispersion angle of the light-scattering device and a distance between the light-scattering device and the light receiving device. The number of samplings may be defined based on the number of light receiving devices. As described above, the wavelength span and the number of samplings may be defined from the configurations of the spectroscope.

The light source may have a light source spectrum satisfying following an equation, $$\Delta\lambda < \frac{2 \cdot \ln 2 \cdot \Delta w}{3\pi}$$

where $\Delta w$ denotes a wavelength span, n denotes a refractive index of the object to be measured, and $\Delta\lambda$ denotes a half-width at half-maximum of the light source spectrum.

The spectroscope may measure the intensity distribution by using the number of samplings, which satisfies following an equation, $$N_s > \frac{4 \cdot n \cdot d \cdot \Delta w}{\lambda_0^2}$$

where $\lambda_o$ denotes a central wavelength of the light source, $\Delta w$ denotes a wavelength span of the spectroscope, n denotes a refractive index of the object to be measured, d denotes a maximum thickness of the object to be measured by the temperature measuring system, and $N_s$ denotes the number of samplings.

The object to be measured may be formed of silicon, quartz, or sapphire.

The optical path length calculation unit may include a Fourier transformation unit, a data interpolation unit, and a center calculation unit. The Fourier transformation unit calculates an intensity distribution according to an optical path length by Fourier transforming the interference intensity distribution. The data interpolation unit divides a data interval after the Fourier transformation into the number of divisions that is defined by predetermined temperature accuracy, and linearly interpolates the number of pieces of data according to the number of divisions. The center calculation unit calculates an optical path length by calculating a weight applied center by using the data interpolated by the data interpolation unit. Thus, the temperature measurement may be performed accurately and stably by interpolating the data points according to predetermined temperature accuracy.

According to another aspect of the present invention, a substrate processing apparatus includes a temperature measuring system. The substrate processing apparatus may include a processing chamber, a light source, a spectroscope, an optical transfer mechanism, an optical path length calculation unit, a temperature calculation unit and a light source spectrum. The processing chamber is configured to be vacuum exhausted and to accommodate the substrate. The light source generates measuring light having a wavelength transmittable through the substrate. The optical transfer mechanism emits the measuring light from the light source to the first main surface of the substrate. Also, the optical transfer mechanism emits light reflected from the first main surface and the second main surface of the substrate to the spectroscope. The spectroscope measures an interference intensity distribution that is an intensity distribution of the reflected light representing an intensity distribution depending on a wavelength or a frequency. The optical path length calculation unit calculates a length of an optical path by Fourier transforming an interference intensity distribution that is an intensity distribution of the reflected light. The temperature calculation unit calculates the temperature of the substrate based on the optical path length calculated by the optical path length calculation unit and a relation between optical path lengths and temperatures of the substrate, which are measured in advance. The light source may have the light source spectrum of a half-width at half-maximum satisfying conditions based on a wavelength span of the spectroscope. The spectroscope may measure the intensity distribution by using the number of samplings, which satisfies conditions based on the wavelength span of the spectroscope and a maximum thickness of the substrate to be measured.

In order to measure a thickness with high accuracy, specifications of elements have to be appropriately set. In the substrate processing apparatus, a wavelength span of the spectroscope is not infinite, but finite, that is, a data interval after the Fourier transformation and a maximum measurable thickness are defined, and thus, the light source and the spectroscope have specifications required to measure the temperature at a desired accuracy. That is, by preparing the light source satisfying conditions based on the wavelength span and the spectroscope satisfying conditions based on the wavelength span and the maximum measurable thickness, the temperature may be measured appropriately by using the optical interference. Also, a temperature of a substrate disposed in a vacuum atmosphere may be measured.

According to another aspect of the present invention, provided is a temperature measuring method using a temperature measuring system. The temperature measuring system may include a light source, a spectroscope, and an optical transfer mechanism. The light source generates measuring light having a wavelength transmittable through the object to be measured. The optical transfer mechanism emits the measuring light from the light source to the first main surface of the object to be measured. Also, the optical transfer mechanism emits light reflected from the first main surface and the second main surface to the spectroscope. The spectroscope measures an interference intensity distribution that is an intensity distribution of the reflected light representing an intensity distribution depending on a wavelength or a frequency. The light source may have the light source spectrum of a half-width at half-maximum satisfying conditions based on a wavelength span of the spectroscope. The spectroscope may measure the intensity distribution by using the number of samplings, which satisfies conditions based on the wavelength span of the spectroscope and a maximum thickness of the object to be measured by the temperature measuring system. The temperature measuring method may include a Fourier transformation process, a data interpolation process, a center calculation process and a temperature calculation process. The Fourier transformation process calculates an intensity distribution according to an optical path length by Fourier transforming an interference intensity distribution that is an intensity distribution of reflected light from the first main surface and the second main surface. The data interpolation process divides a data interval after the Fourier transformation into the number of divisions defined by predetermined temperature accuracy, and linearly interpolating the number of pieces of data according to the number of divisions. The center calculation process calculates an optical path length by calculating a weight applied center by using the data interpolated in the data interpolation process. The temperature calculation process calculates a temperature of the object to be measured on the basis of the optical path length calculated in the center calculation process and a relation between optical path lengths and temperatures of the object to be measured, which are measured in advance.

In order to measure a thickness with high accuracy, specifications of elements have to be appropriately set. In the temperature measuring system, a wavelength span of the spectroscope is not infinite, but finite, that is, a data interval after the Fourier transformation and a maximum measurable thickness are defined, and thus, the light source and the spectroscope have specifications required to measure the temperature at a desired accuracy. That is, by preparing the light source satisfying conditions based on the wavelength span and the spectroscope satisfying conditions based on the wavelength span and the maximum measurable thickness, the temperature may be measured appropriately by using the optical interference. Also, according to the temperature measuring method, data points are interpolated according to predetermined temperature accuracy so that the temperature measurement can be performed accurately and stably.

BRIEF DESCRIPTION OF THE DRAWINGS

The above and other features and advantages of the present invention will become more apparent by describing in detail exemplary embodiments thereof with reference to the attached drawings in which:

FIG. 5 is a schematic diagram showing a maximum measured thickness;

FIGS. 6A and 6B are schematic diagrams showing a minimum spatial resolution, wherein FIG. 6A shows a spectrum representing an intensity distribution according to location, and FIG. 6B shows a spectrum representing an intensity distribution according to wave number;

FIGS. 7A and 7B are schematic diagrams describing a coherence length, wherein FIG. 7A shows a spectrum representing an intensity distribution according to wave number, and FIG. 7B shows a spectrum representing an intensity distribution according to location;

FIGS. 8A and 8B are schematic diagrams describing data intervals in a spectrum representing an intensity distribution according to location, wherein FIG. 8A shows a spectrum having three data points within a range of a coherence length, and FIG. 8B shows a spectrum having two data points within a range of a coherence length;

FIGS. 11A through 11C are graphs for describing operations of a calculation apparatus, wherein FIG. 11A shows a light source spectrum representing an intensity distribution according to a wavelength, FIG. 11B shows a spectrum of reflected light representing an intensity distribution according to a wavelength; and FIG. 11C shows a spectrum of reflected light representing an intensity distribution according to a reciprocal of a wavelength;

FIGS. 12A through 12C are graphs for describing operations of a calculation apparatus, wherein FIG. 12A shows a spectrum obtained by performing a linear interpolation of a spectrum of reflected light representing an intensity distribution according to a reciprocal of a wavelength, FIG. 12B shows a spectrum obtained by high speed Fourier transformation of the reflected light spectrum of FIG. 12A, and FIG. 12C is an expanded view of a part of FIG. 12B;

DETAILED DESCRIPTION OF THE INVENTION

Figure 1:
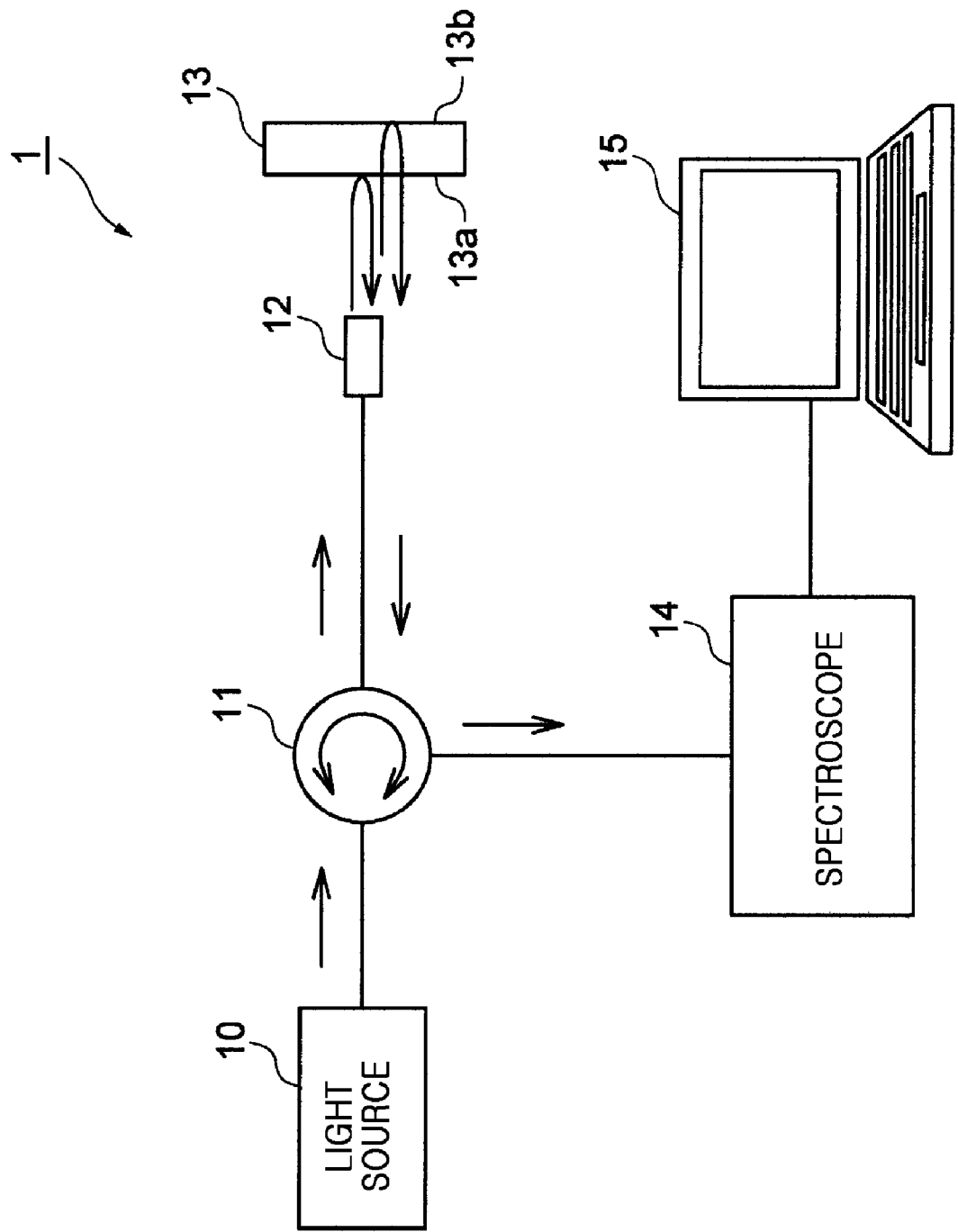
FIG. 1 is a schematic view of a temperature measuring system according to an embodiment of the present invention.

The attached drawings for illustrating exemplary embodiments of the present invention are referred to in order to gain a sufficient understanding of the present invention, the merits thereof, and the objectives accomplished by the implementation of the present invention. Like reference numerals in the drawings denote like elements.

FIG. 1 is a block diagram showing an example of a temperature measuring system according to an embodiment of the present invention. As shown in FIG. 1, the temperature measuring system 1 is a system for measuring a temperature of an object to be measured 13. The temperature measuring system 1 measures the temperature of the object to be measured 13 by using optical interference. The temperature measuring system 1 includes a light source 10, an optical circulator 11, a collimator 12, a spectroscope 14, and a calculation apparatus 15. In addition, connections to each of the light source 10, the optical circulator 11, the collimator 12, and the spectroscope 14 may be performed by using, for example, optical fiber cables.

The light source 10 generates measuring light having a wavelength transmittable through the object to be measured 13. A super luminescent diode (SLD), for example, may be used as the light source 10. In addition, the object to be measured 13 may be formed as, for example, a plate shape, and includes a first main surface 13a and a second main surface 13b facing the first main surface 13a. Hereinafter, if necessary, the first main surface 13a will be referred to as a surface 13a and the second main surface 13b will be referred to as a rear surface 13b. The object to be measured 13 may be, for example, SiO (quartz) or $Al_2O_3$ (sapphire), in addition to Si (silicon). A refractive index of Si is 3.4 when a wavelength is 4 μm. A refractive index of $SiO_2$ is 1.5 when a wavelength is 1 μm. A refractive index of $Al_2O_3$ is 1.8 when a wavelength is 1 μm.

The optical circulator 11 is connected to the light source 10, the collimator 12, and the spectroscope 14. The optical circulator 11 emits the measuring light generated by the light source 10 to the collimator 12. The collimator 12 emits the measuring light to the surface 13a of the object to be measured 13. The collimator 12 emits the measuring light that is adjusted as parallel light to the object to be measured 13. In addition, light reflected from the object to be measured 13 is incident on the collimator 12. The reflected light includes light reflected from the rear surface 13b and light reflected from the surface 13a. The collimator 12 emits the reflected light to the optical circulator 11. The optical circulator 11 emits the reflected light to the spectroscope 14. In addition, an optical transfer mechanism is configured to include the optical circulator 11 and the collimator 12.

Figure 2:
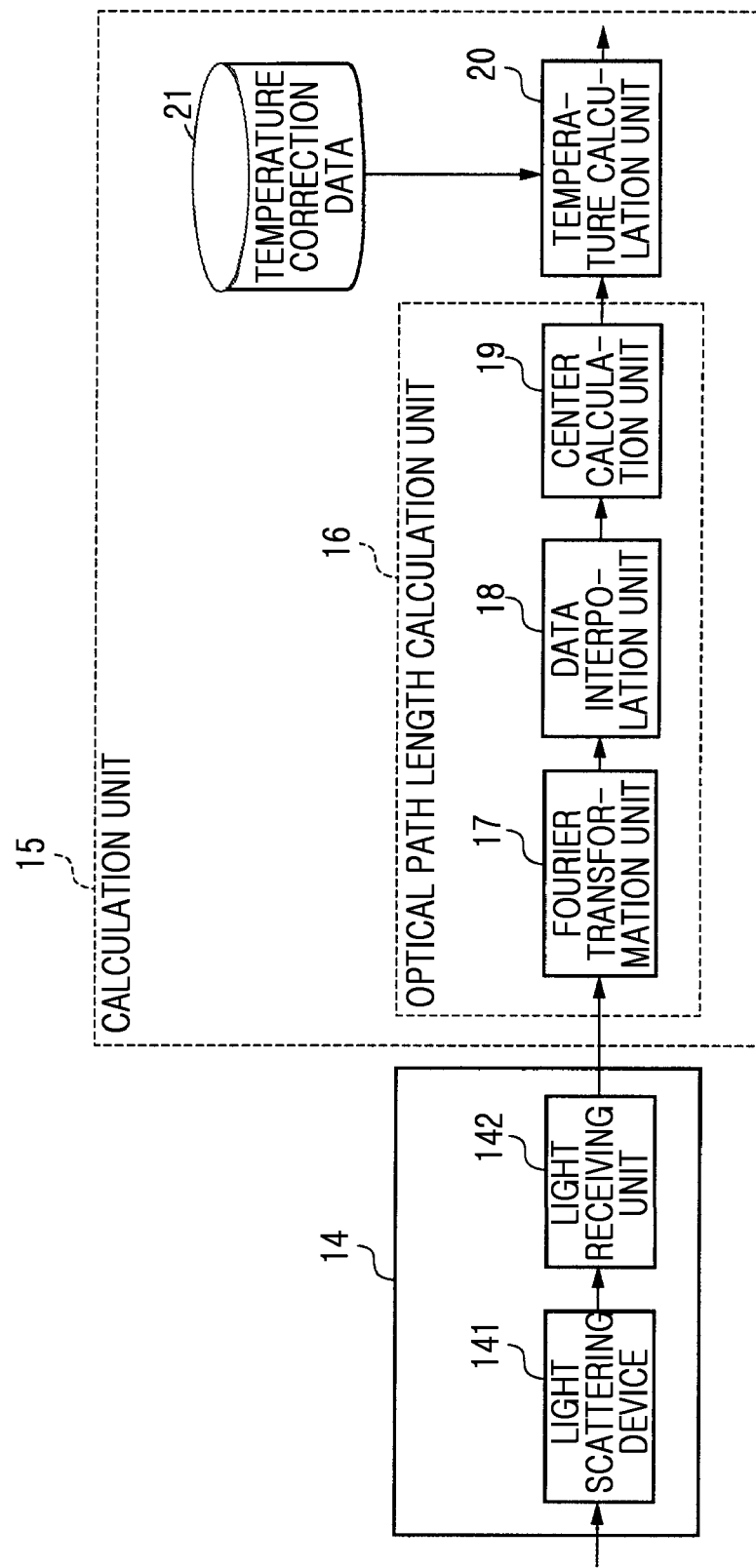
FIG. 2 is a functional block diagram of a spectroscope and a calculation apparatus.

The spectroscope 14 measures the spectrum of the reflected light (interference intensity distribution) obtained from the optical circulator 11. The reflected light spectrum represents an intensity distribution according to wavelengths or frequencies of the reflected light. FIG. 2 is a functional block diagram of the spectroscope 14 and the calculation apparatus 15. As shown in FIG. 2, the spectroscope 14 includes, for example, a light-scattering device 141 and a light receiving unit 142. The light-scattering device 141 is, for example, a diffraction grating, and is a device for dispersing the light with a predetermined dispersion angle at every wavelength. The light receiving unit 142 acquires the light dispersed by the light-scattering device 141. A charge coupled device (CCD) in which a plurality of light receiving devices are arranged as gratings is used as the light receiving unit 142. The number of light receiving devices is the number of samplings. In addition, wavelength spans are regulated based on the dispersion angle of the light-scattering device 141 and a distance between the light-scattering device 141 and the light receiving devices. Accordingly, the reflected light is dispersed at every wavelength or every frequency, and intensity is obtained at every wavelength or every frequency. The spectroscope 14 outputs the reflected light spectrum to the calculation apparatus 15.

The calculation apparatus 15 measures a temperature of the object to be measured 13 based on the reflected light spectrum. The calculation apparatus 15 includes an optical length calculation unit 16, a temperature calculation unit 20, and a temperature correction data 21. The optical path length calculation unit 16 includes a Fourier transformation unit 17, a data interpolation unit 18, and a center calculation unit 19. The Fourier transformation unit 17 performs Fourier transformations of the reflected light spectrum by using a fast Fourier transform (FFT) method. For example, in Fourier transformation in a time domain, the reflected light spectrum representing an intensity distribution according to frequency (the number of vibrations per unit time) is transformed into the reflected light spectrum representing an intensity distribution according to time. In addition, for example, in Fourier transformation in a spatial domain, the reflected light spectrum representing an intensity distribution according to a spatial frequency (the number of vibrations per unit length) is transformed into the reflected light spectrum representing an intensity distribution according to location. The data interpolation unit 18 interpolates data points within a range including a predetermined peak value in the reflected light spectrum after the Fourier transformation. The center calculation unit 19 calculates a central location of a predetermined peak value in the reflected light spectrum after the Fourier transformation. The optical path length calculation unit 16 calculates an optical path length based on the central location.

The temperature calculation unit 20 calculates a temperature of the object to be measured 13 based on the optical path length. The temperature calculation unit 20 calculates the temperature of the object to be measured 13 by referencing the temperature correction data 21. The temperature correction data 21 is data that is measured in advance and represents a relation between temperatures and optical path lengths.

Figure 3:
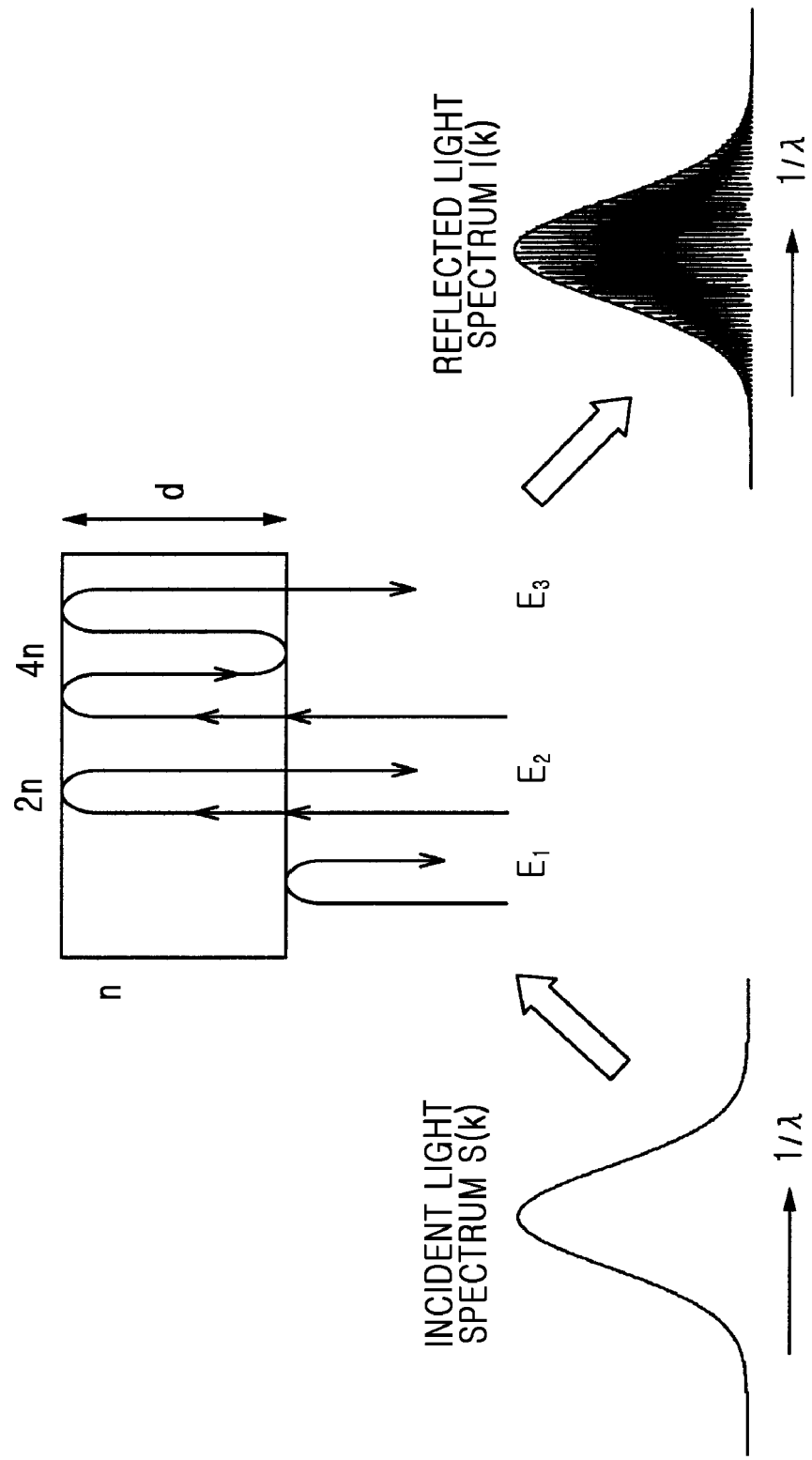
FIG. 3 is a schematic diagram showing a spectrum of incident light and a spectrum of reflected light.

According to the temperature measuring system 1 having the above structure, the temperature of the object to be measured 13 is measured by using optical interference between the surface 13a and the rear surface 13b of the object to be measured (FFT frequency region method). Hereinafter, a principle of light interference will be described. FIG. 3 is a schematic diagram for describing an incident light spectrum and a reflected light spectrum. As shown in FIG. 3, the measuring light from the light source 10 is incident light. An intensity S(k) of the incident light spectrum is dependent upon a spatial frequency $1/\lambda$ (the number of vibrations per unit length). When it is assumed that a wavelength of the light source 10 is $\lambda$, a wave number k is $2\pi/\lambda$. A thickness of the object to be measured 13 is d, a reflective index of the object to be measured is n, and a reflectance of the object to be measured 13 is R. Reflected light E is obtained by overlapping a plurality of reflected components. For example, $E_1$ is a reflected component from the surface 13a, and $E_2$ is a reflected component from the rear surface 13b. $E_3$ is a component reflected once from the surface 13a, and twice from the rear surface 13b. In addition, reflected components after $E_4$ are not provided here. By overlapping a plurality of reflected components, an intensity of I(k) of the reflected light spectrum is obtained. The intensity I(k) of the reflected light spectrum is represented with respect to the intensity S(k) of the incident light spectrum by following equation (1).

$$I(k) \propto \{2R(1-R)-2R(1-2R)\cos(2nkd)-2R^2 \cos(4nkd)\}S(k) \quad (1)$$

In the above equation (1), a second term is a term relating to interference between a surface and a rear surface and a third term is a term relating to multiple-interference between a surface and a rear surface. When the above equation (1) is Fourier transformed, the reflected light spectrum according to location may be obtained.

Figure 4:
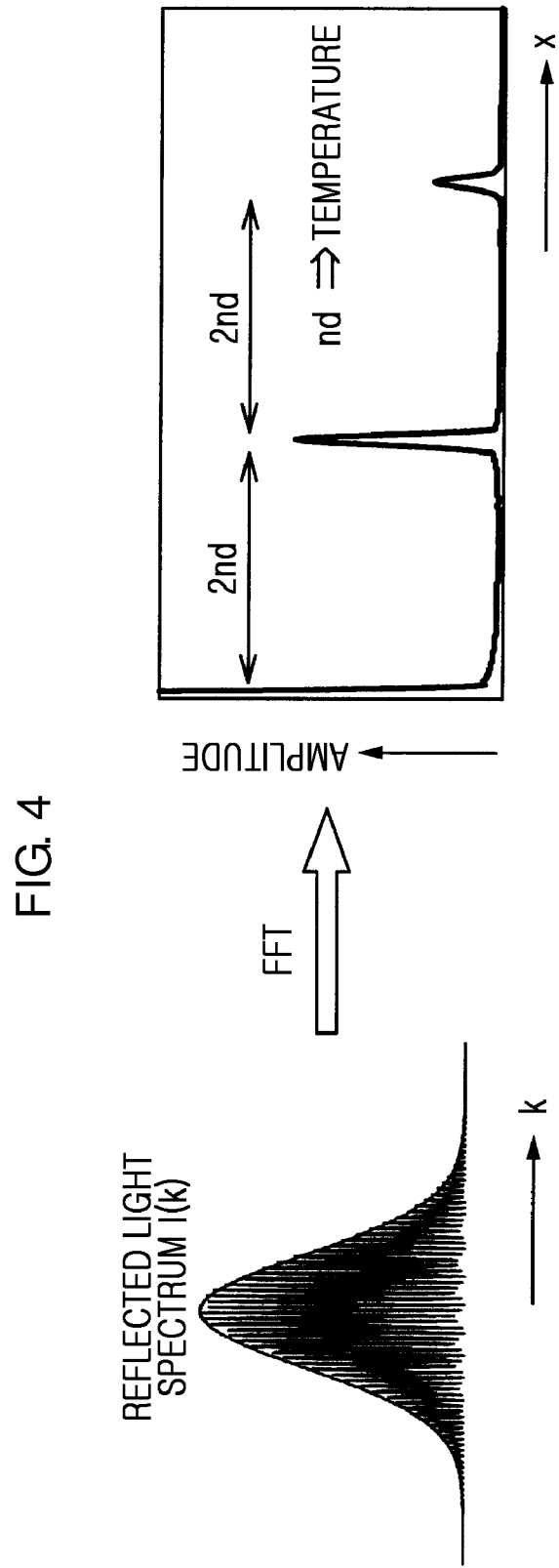
FIG. 4 is a schematic diagram describing Fourier transformation of the reflected light spectrum.

FIG. 4 is a schematic diagram for describing Fourier transformation of the reflected light spectrum I(k). As shown in FIG. 4, by the spatial domain Fourier transformation, the spatial frequency $1/\lambda$ is transformed to a location x. The intensity I(k) of the reflected light spectrum that is transformed to the location x is as follows by performing Fourier transformation of the above equation (1).

$$I(x)=2R(1-R)\cdot S(x)-R(1-2R)\cdot\{S(x+2nd)+S(x-2nd)\}- R^2\cdot\{S(x+4nd)+S(x-4nd)\} \quad (2)$$

As shown in the above equation (2), a peak appears at every 2nd. Here, 2nd is an optical path difference between optical paths of the surface and the rear surfaces. That is, nd is an optical path length between the surface and the rear surface. As described above, the temperature may be calculated by defining the optical path length nd in a relation between the optical path lengths nd and the temperature, which is measured in advance. In addition, in the above description, the spatial domain Fourier transformation is used; however, a time domain Fourier transformation can be used. When a frequency is v, the location x satisfies following equation.

$$2\pi \cdot v \cdot t = 2\pi \cdot \frac{v}{c} \cdot ct = 2\pi \cdot \frac{1}{\lambda} \cdot x$$

Here, a difference between a case where a thickness of the object to be measured 13 is measured by using the FFT frequency region method and a case where a temperature of the object to be measured 13 is measured will be described. In general, a thickness of an object to be measured by the FFT frequency region method can be measured with an accuracy of hundreds of μm order. However, when measuring the temperature by 1° C., an accuracy of hundreds of Å order is necessary. That is, it is difficult to use a thickness measuring system simply as a temperature measuring system, and equipment satisfying conditions such as the light source, the spectroscope, and the like has to be used to measure the temperature. Hereinafter, conditions of the equipment will be described.

First, a maximum thickness measurable by the temperature measuring system 1 (maximum measuring thickness) and data intervals after the Fourier transformation of the reflected light spectrum will be described. FIG. 5 is a schematic view for describing the reflected light. As shown in FIG. 5, in the object to be measured 13 having a thickness d and a refractive index n, a location of the surface is 0 and a location of the rear surface is x. Here, a relation between time $\Delta\tau$ and an angular frequency $\Delta\omega$ in FFT is represented by following equation (3).

$$\Delta\tau = \frac{2\pi}{\Delta\omega} \quad (3)$$

Here, the angular frequency $\omega$ and $\Delta\omega$ are represented in terms of a wavelength $\lambda$ and a half-width at half-maximum $\Delta\lambda$ of the light source spectrum as follows.

$$\omega = 2\pi \cdot v = 2\pi \frac{c}{\lambda}, \quad \Delta\omega = -2\pi \cdot \frac{c}{\lambda^2}\Delta\lambda \quad (4)$$

Since the frequency is a positive value, following equation is satisfied.

$$\Delta\omega = -2\pi \cdot \frac{c}{\lambda^2} \cdot \Delta\lambda \Rightarrow 2\pi \cdot \frac{c}{\lambda^2} \cdot \Delta\lambda \quad (5)$$

Therefore, following equation is obtained.

$$\Delta\tau = \frac{2\pi \cdot \lambda^2}{2\pi \cdot c \cdot \Delta\lambda} = \frac{\lambda^2}{c \cdot \Delta\lambda} \quad (6)$$

When it is assumed that a distance that light travels for the time $\Delta\tau$ in the object to be measured 13 having the refractive index n (average refractive index ($n_{ave}$)) is $\Delta x'$, the distance $\Delta x'$ is represented in following equation by using the above equations (3) and (5).

$$\Delta x' = \frac{c}{n_{ave}} \cdot \Delta\tau = \frac{\lambda^2}{n_{ave} \cdot \Delta\lambda} \quad (7)$$

Since the light is transmitted through the surface and is reflected by the rear surface, the distance $\Delta x'$ is $2\Delta x$ in consideration of reciprocating distance. According to the above equation, data interval $\Delta x$ in the reflected light spectrum after the FFT is represented by following equation.

$$\Delta x = \frac{c}{2 \cdot n_{ave}} \cdot \Delta\tau = \frac{\lambda^2}{2 \cdot n_{ave} \cdot \Delta\lambda} \quad (8)$$

In the frequency region method, an actual spectrum intensity I(k) is a discrete value of the number of samplings ($N_s$) in a wavelength axis direction. Therefore, the data after the FFT becomes $N_s/2$ numbers of discrete pieces of data with an interval $\Delta x$. Therefore, a maximum optical thickness $X_{max}$ that is measurable can be represented by following equation.

$$x_{max} = \frac{\lambda^2}{2n_{ave} \cdot \Delta\lambda} \cdot \frac{N_s}{2} = \frac{\lambda^2}{4n_{ave} \cdot \Delta\lambda} \cdot N_s \quad (9)$$

This is a value of a coordinate in an actual space, and the data of the spectrum after the FFT becomes $2n_{ave}$ multiple of this value. Therefore, in the space after the FFT, the maximum measurable optical thickness $X_{max}$ and the data interval $\Delta X$ can be represented by following equations.

$$X_{max} = 2 \cdot n_{ave} \cdot x_{max} = \frac{\lambda^2}{2 \cdot \Delta\lambda} \cdot N_s \quad (10)$$

$$\Delta X = 2 \cdot n_{ave} \cdot \Delta x = \frac{\lambda^2}{\Delta\lambda} \quad (11)$$

The above equations are general equations that are not affected by a refractive index of a medium, and are determined only by conditions of the measuring system. In an actual measuring system, since $\Delta\lambda$ can be considered as a minimum period of the FFT, herein, $\Delta\lambda$ may be considered as a measured wavelength range of the spectroscope or a wavelength scan range. When it is assumed that the wavelength span is $\Delta w$ and a central wavelength of the spectroscope is $\lambda_0$, equations (10) and (11) are as follows.

$$X_{max} = \frac{\lambda_0^2}{2 \cdot \Delta w} \cdot N_s \quad (12)$$

$$\Delta X = \frac{\lambda_0^2}{\Delta w} \quad (13)$$

Therefore, when the wavelength range $\Delta w$ of the spectroscope is increased, the data interval $\Delta X$ after the FFT may be reduced. In addition, when the number of samplings $N_s$ is increased, thicker medium may be measured. Accordingly, reducing of the data interval and increasing of the measurable thickness cannot be compatible with each other. The above equations are general equations that are not affected by the refractive index. Therefore, when converting the above equation 10 into actual scales in the medium having the refractive index $n_{ave}$, $2n_{ave}$ is removed.

Figure 6A:
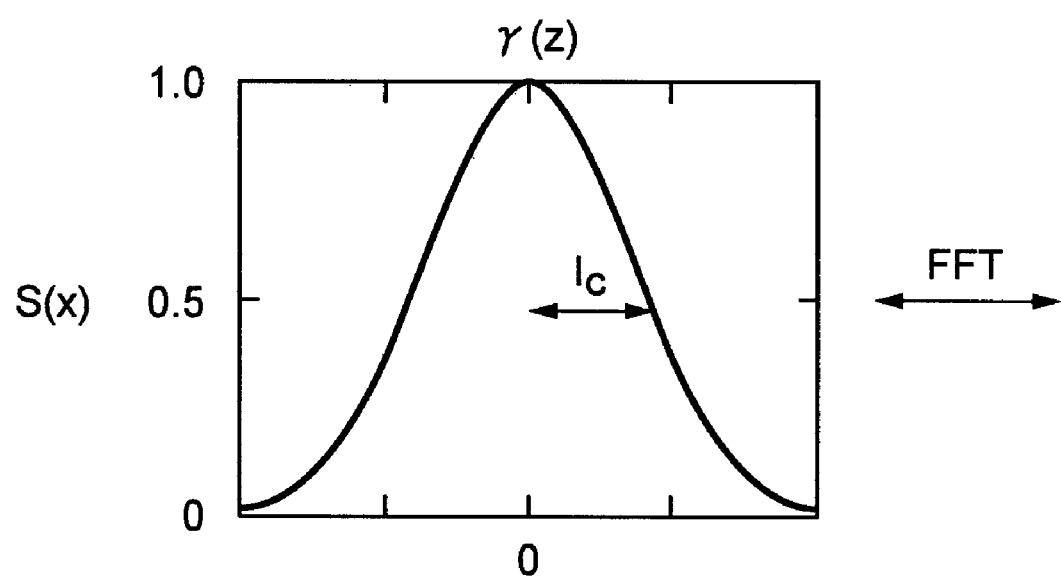
Figure 6B:
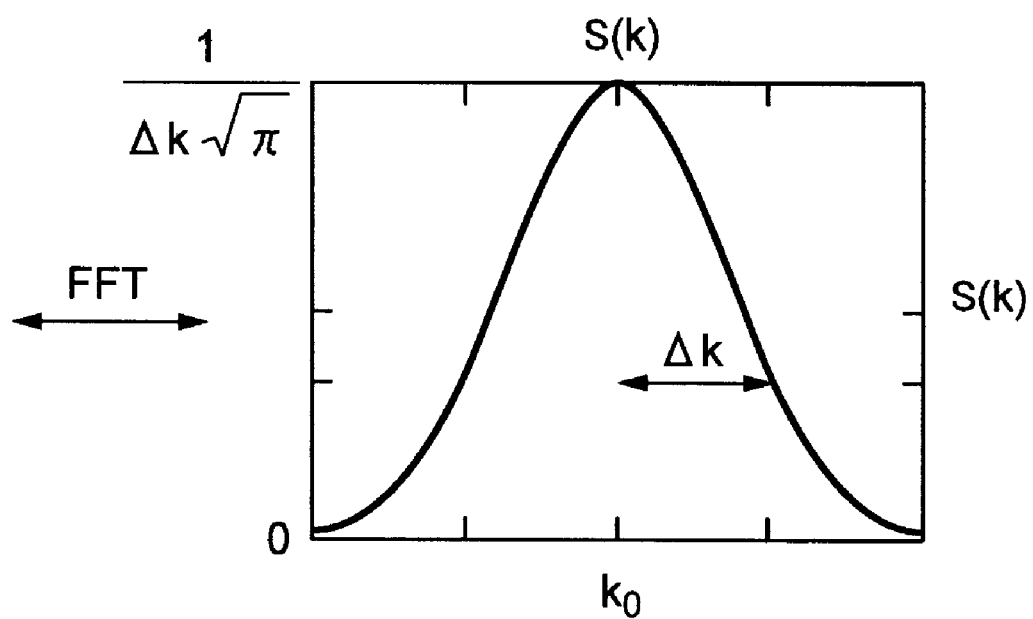

Here, a minimum spatial resolution will be described. FIGS. 6A and 6B are schematic views for describing the minimum spatial resolution. FIG. 6B shows spectrum representing the intensity distribution, according to the wave number (k) of the light source, which may be approximated by a Gaussian function. An intensity S(k) of the spectrum shown in FIG. 6B can be represented by following equation, when the wave number of the peak value is $k_0$, an intensity of the peak value $1/\Delta k \cdot (\pi)^{1/2}$, and a half-width at half-maximum is $\Delta k$.

$$S(k) = \frac{1}{\Delta k \sqrt{\pi}} \cdot \exp\left[-\left(\frac{k-k_0}{\Delta k}\right)^2\right] = \frac{1}{\Delta k \sqrt{\pi}} \cdot \exp\left[-\left(\frac{k-k_0}{\Delta k'}\right)^2 \cdot \ln 2\right] \quad (14)$$

In addition, following equation is satisfied.

$$\Delta k = \frac{\Delta k'}{\sqrt{\ln 2}} \quad (15)$$

Also, a relation shown in following equation is satisfied.

$$k = \frac{2\pi}{\lambda} \rightarrow \Delta k = \frac{2\pi}{\lambda^2} \cdot \Delta\lambda \quad (16)$$

The half-width at half-maximum $\Delta k$ can be represented as following equation by using the above equations (15) and (16).

$$\Delta k = \frac{2\pi \cdot \Delta\lambda}{\lambda^2 \sqrt{\ln 2}} \quad (17)$$

Meanwhile, when the spectrum of FIG. 6B is transformed by the FFT, the spectrum of FIG. 6A is obtained. FIG. 6A shows the spectrum of a Gaussian function representing an intensity distribution according a location x. An intensity S(x) of the spectrum of FIG. 6A can be represented by following equation, when a location of the peak value is 0 and the intensity of the peak is 1.

$$S(x) = \exp(-x^2 \cdot \Delta k^2) = \exp\left[-\left(\frac{x}{\Delta x'_g}\right)^2 \cdot \ln 2\right] \tag{18}$$

In addition, the half-width at half-maximum $\Delta k$ and a half-width at half-maximum $\Delta x_g$ of $S(x)$ have a relation represented by the following equation.

$$\Delta k^2 = \frac{\ln 2}{\Delta x_g^2} \tag{19}$$

When the half-width at half-maximum is $I_c$ the half-width at half-maximum $\Delta x_g$ of $S(x)$ can be represented by following equation based on the above equation (19).

$$\Delta x_g = \frac{\sqrt{\ln 2}}{\Delta k} = \frac{\ln 2}{2\pi} \cdot \frac{\lambda^2}{\Delta \lambda} = \frac{l_c}{2} \tag{20}$$

The half-width at half-maximum $I_c$ of the spectrum having the intensity $S(x)$ becomes a coherence length. The minimum spatial resolution is $I_c$ that is determined by the central wavelength and the half-value width of the spectrum of the light source 10.

Next, a condition about the number of samplings $N_s$ required by the spectroscope 14 will be derived based on the above described maximum measurable optical thickness $x_{max}$. When a central wavelength of the light source 10 is $\lambda_0$, a half-width at half-maximum of the light source spectrum is $\Delta \lambda$, a wavelength span of the spectroscope 14 is $\Delta w$, and a refractive index of the object to be measured 13 is n, the maximum measurable optical thickness $x_{max}$ is represented by following equation, based on the above equation (9).

$$x_{max} = \frac{\lambda_0^2}{4 \cdot n \cdot \Delta w} \cdot N_s \tag{21}$$

Here, a maximum measurable thickness d and the maximum measurable optical thickness $x_{max}$ have to satisfy following equation.

$$d < x_{max} = \frac{\lambda_0^2}{4 \cdot n \cdot \Delta w} \cdot N_s \tag{22}$$

That is, the number of samplings $N_s$ satisfying following inequality is necessary.

$$N_s > \frac{4 \cdot n \cdot d \cdot \Delta w}{\lambda_0^2} \tag{23}$$

For example, if the maximum measurable thickness d is 0.775 mm, the central wavelength $\lambda_0$ of the light source 10 is 1550 nm, and the refractive index n of the object to be measured 13 is 3.7, following inequality is obtained.

$$\frac{\Delta w}{N_s} < 2 \times 10^{-10} \tag{24}$$

Also, when the wavelength span $\Delta w$[m] is converted into $\Delta w'$[nm], following inequality is obtained.

$$\Delta w'[\text{nm}] < 0.2 N \tag{25}$$

The temperature measuring system 1 includes the spectroscope 14 having the wavelength span $\Delta w'$[nm] and the number of samplings $N_s$ satisfying the above inequality (25). For example, when the wavelength span $\Delta w'$[nm] is 40 nm, the number of samplings $N_s$ is greater than 200. That is, when the wavelength span $\Delta w'$[nm] is 40 nm, the light receiving unit 142 in which more than 200 light receiving devices are arranged is necessary.

Figure 7A:
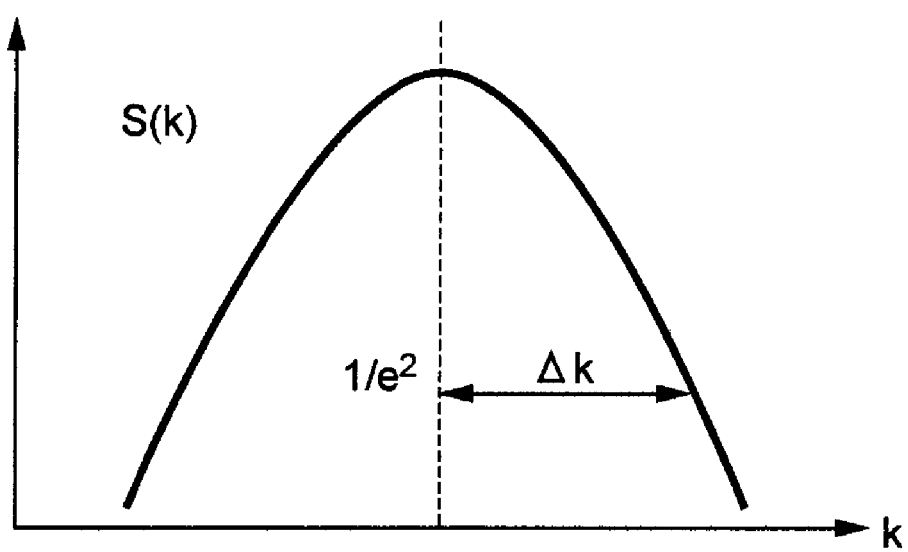
Figure 7B:
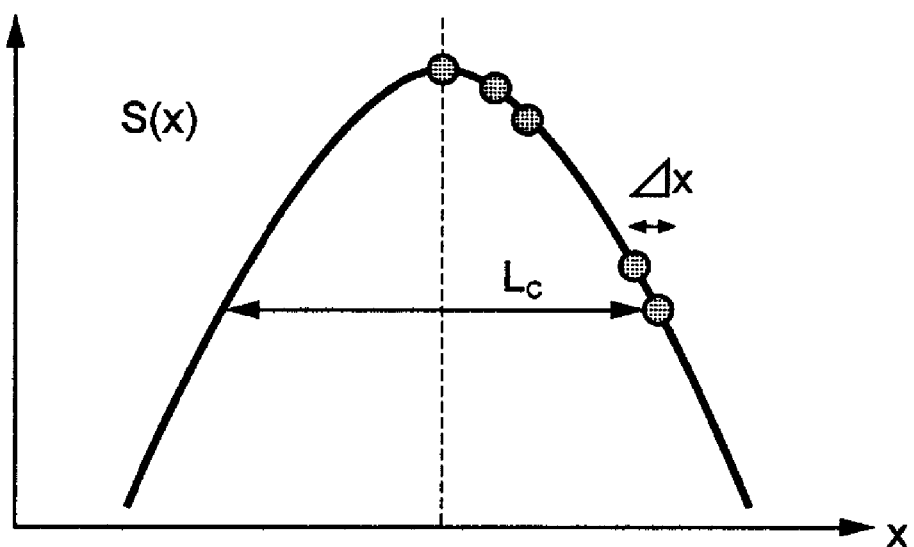

Next, a condition of the half-width at half-maximum ($\Delta \lambda$) of the light source spectrum required by the light source 10 is derived based on the above described data interval $\Delta x$. FIGS. 7A and 7B are graphs for describing a coherence length. FIG. 7A shows the spectrum representing an intensity distribution according to wave number. $\Delta k$ is a half-width at half-maximum of the peak value of the wave number $k=1/e^2$. FIG. 7B shows the spectrum representing an intensity distribution according to location. The spectrum of FIG. 7B is obtained by Fourier transforming the spectrum of FIG. 7A. A coherence length $L_c$, that is, a full-width at half-maximum, is represented by following equation, when a central wavelength of the light source 10 is $\lambda_o$ and a half-width at half-maximum of the light source spectrum is $\Delta \lambda$.

$$L_c = \frac{2\sqrt{\ln 2}}{\Delta k} = \frac{2 \cdot \ln 2}{\pi} \cdot \frac{\lambda_0^2}{\Delta \lambda} \tag{26}$$

Figure 8A:
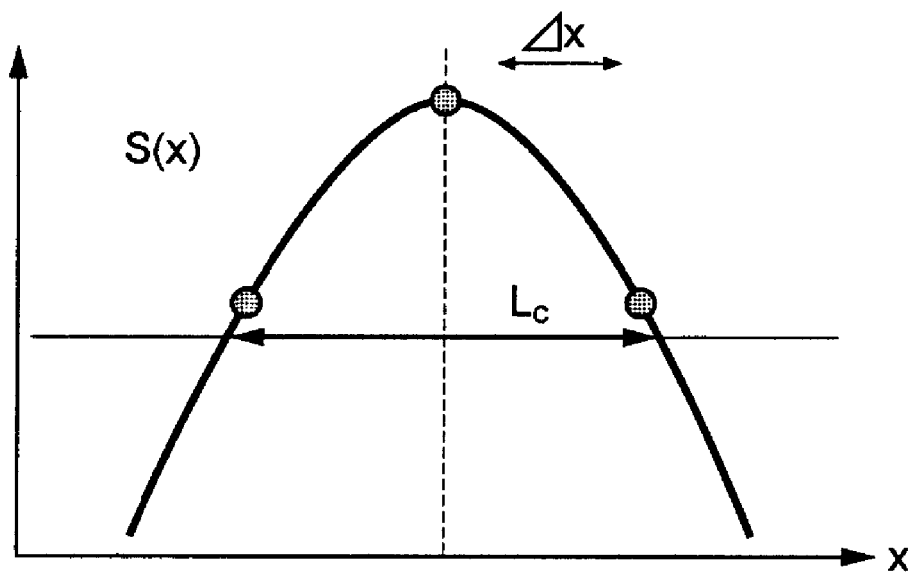
Figure 8B:
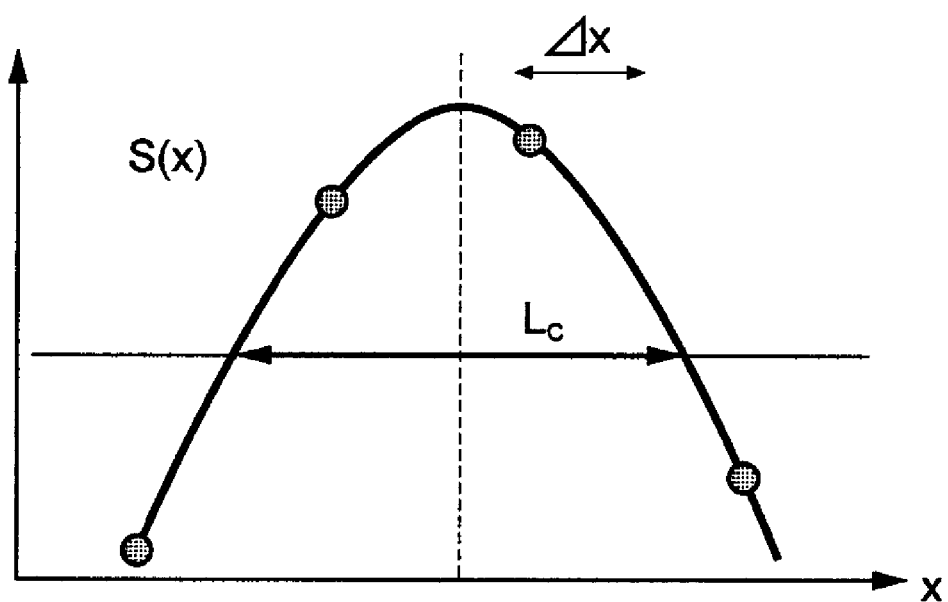

Here, the data interval $\Delta x$ that is necessary to obtain a central peak appropriately will be considered by using the above coherence length $L_c$. In addition, the full-width at half-maximum $L_c$, is a space after performing the FFT, and is different from actual scales. Likewise, $\Delta x$ is a space of actual scale; the calculation is performed by using $\Delta x$ in order to be suitable for the space after the FFT. Here, $\Delta X$ is $2n\Delta x$. A signal after the FFT is determined by the half-width at half-maximum $\Delta \lambda$ of the light source 10 and the wavelength span $\Delta w$ of the spectroscope 14. In order to calculate the central peak accurately, at least three data points have to be included in full-width at half-maximum of the signal after the FFT. For example, as shown in FIG. 8A, three data points have to be included. In addition, as shown in FIG. 8B, under a condition of $L_c > 2\Delta X$, only two data points are included in the full-width at half-maximum if the peak location and the data points do not match with each other. Thus, if at least four data points are to be included, a condition $L_c > 3\Delta X$ has to be satisfied. Following inequality is satisfied between the full-width at half-maximum $L_c$ and the data interval $\Delta X$ by using the equation (26).

$$L_c = \frac{2 \cdot \ln 2}{\pi} \cdot \frac{\lambda_0^2}{\Delta \lambda} > 3 \cdot \Delta X = \frac{3 \cdot \lambda_0^2}{\Delta w} \tag{27}$$

When the inequality (27) is written in terms of the half-width at half-maximum $\Delta \lambda$ of the light source 10, following inequality is obtained.

$$\Delta \lambda < \frac{2 \cdot \ln 2 \cdot \Delta w}{3\pi} \quad (28)$$

Also, when the wavelength span $\Delta w$ and the half-width at half-maximum $\Delta \lambda$ of the spectrum of the light source 10 are determined, the number of data points Nc within the coherence length $L_c$ can be identified from following equation.

$$N_c = \frac{L_C}{\Delta x} = \frac{2 \cdot \ln 2 \cdot \Delta w}{\pi \cdot \Delta \lambda} \quad (29)$$

Figure 9:
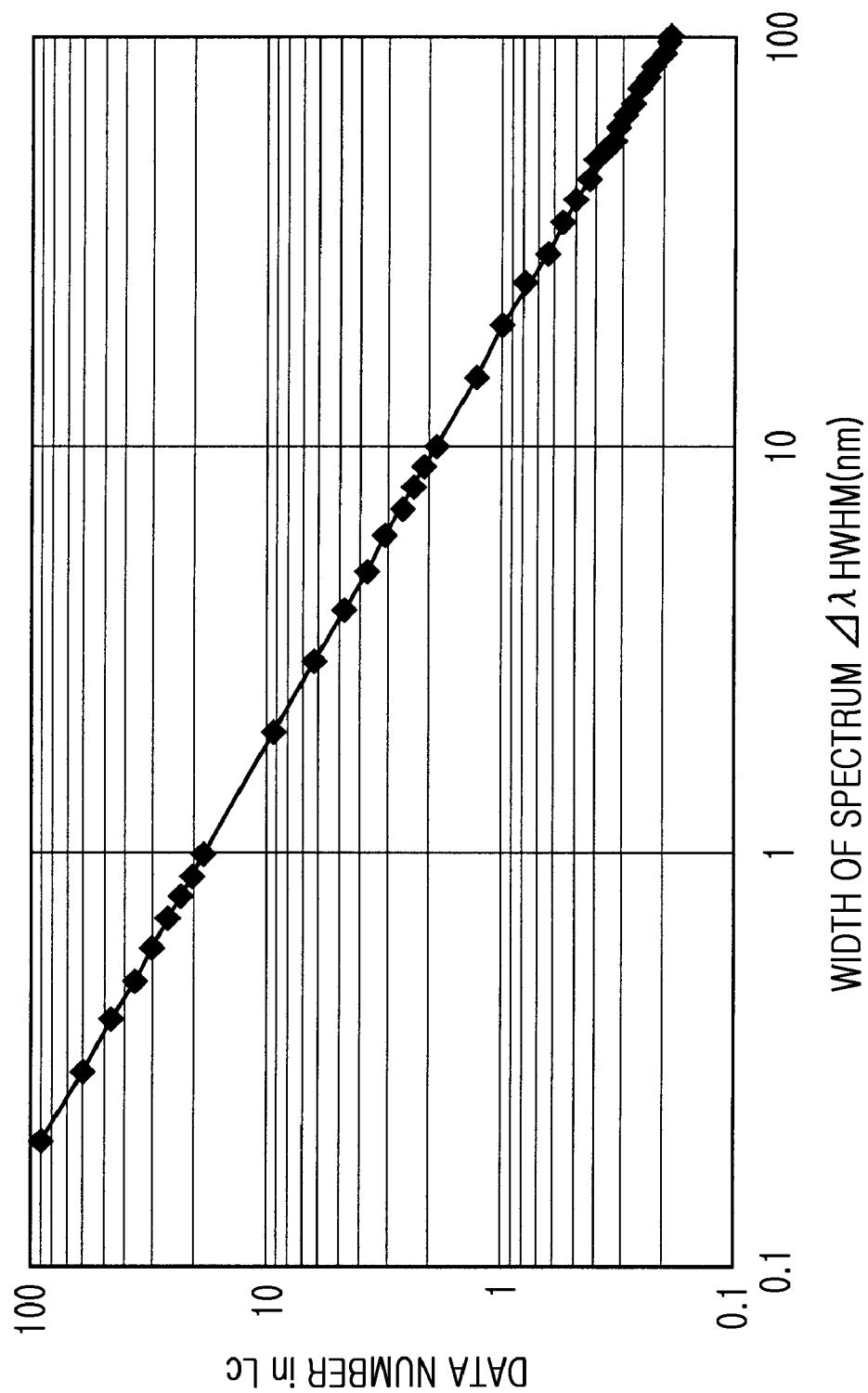
FIG. 9 is a graph showing a relation between the number of data points within a coherence length and a half-width at half-maximum of a spectrum.

FIG. 9 is a graph showing a relation between the number of data points within the coherence length and the half-width at half-maximum of the spectrum. A transverse axis denotes the half-width at half-maximum $\Delta \lambda$ of the spectrum of the light source 10 and a longitudinal axis denotes the number of data points $N_c$ within the coherence length $L_c$. When the wavelength span $\Delta w$ of the light source 10 is 42 nm ($\Delta w$=42 nm), a value of $\Delta \lambda$ has to be less than 6.18 nm ($\Delta \lambda$<6.18 nm) in order to satisfy m>3 in the equation (29). The temperature measuring system 1 includes the light source 10 having the half-width at half-maximum $\Delta \lambda$ that satisfies the inequality (28).

Figure 10:
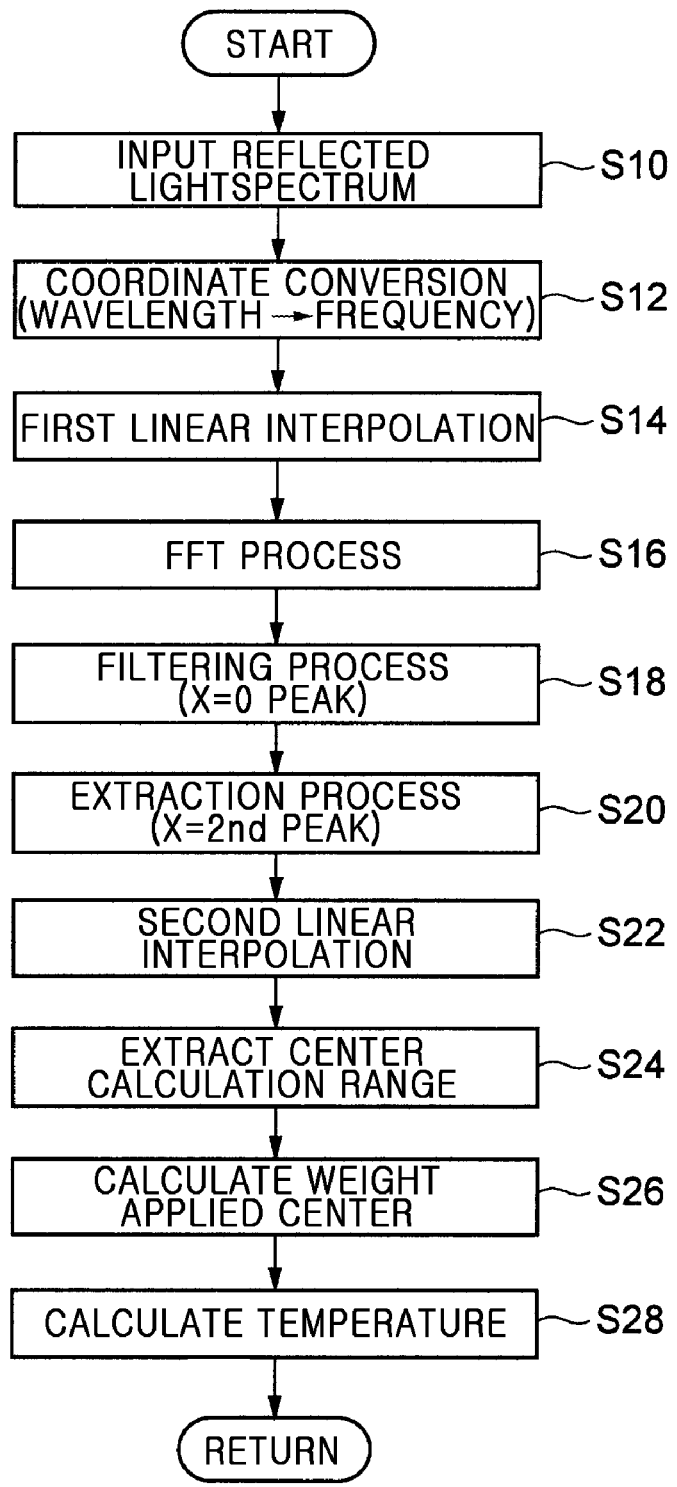
FIG. 10 is a flowchart showing operations of a calculation apparatus.

Next, a temperature measuring operation of the temperature measuring system 1 will be described. FIG. 10 is a flowchart for describing operations of the temperature measuring system 1. Controlling processes shown in FIG. 10 are repeatedly performed at a predetermined interval from a timing when, for example, the light source 10 and the calculation apparatus 15 are turned on.

Figure 11A:
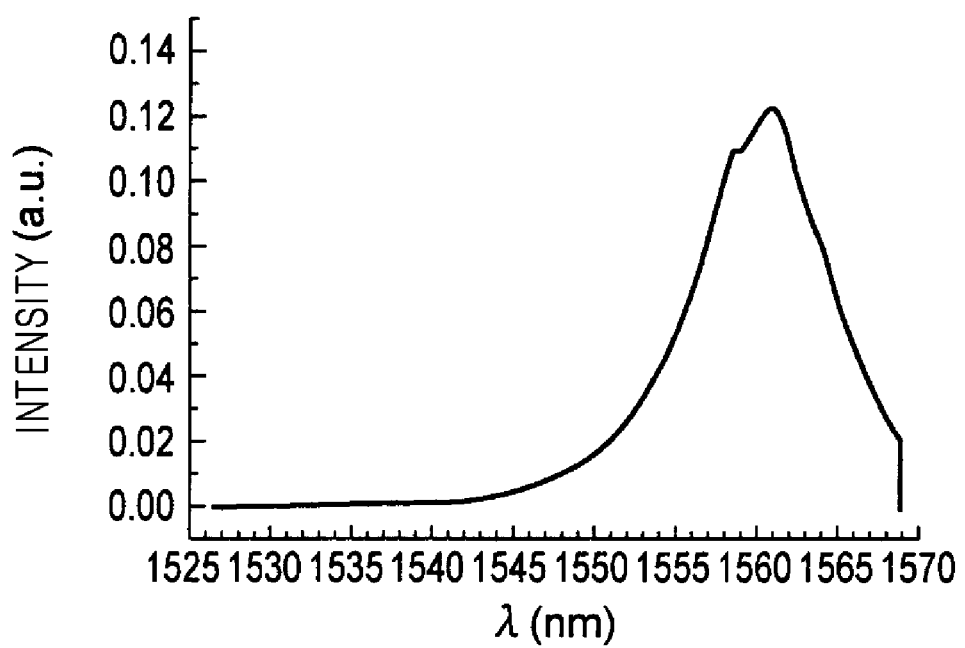
Figure 11B:
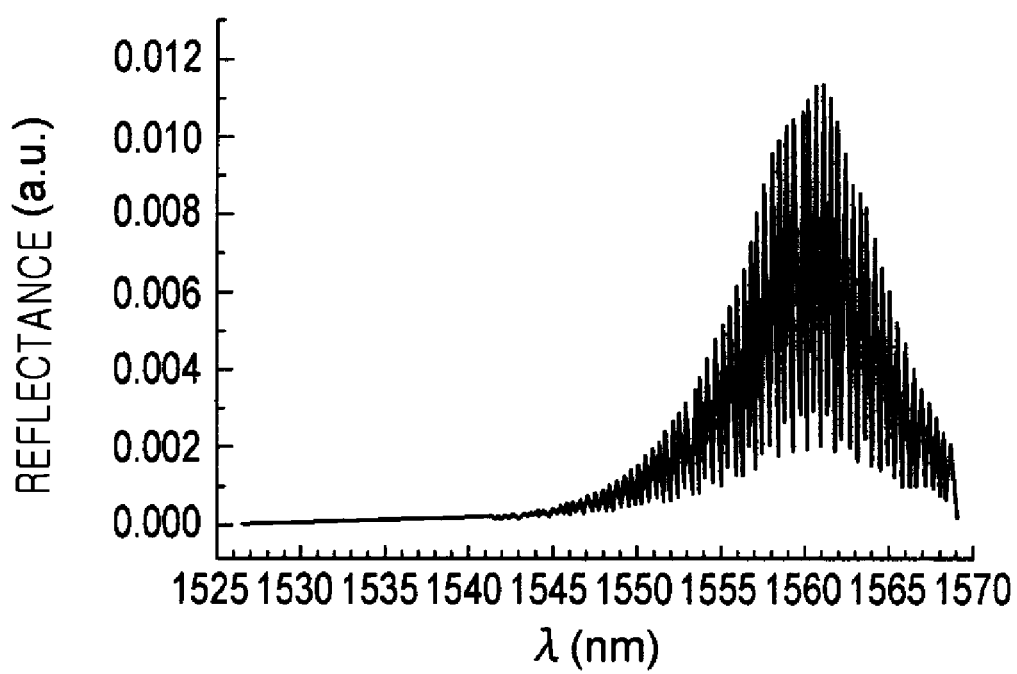

As shown in FIG. 10, a process of inputting the reflected light spectrum starts (S10). The light source 10 generates the measuring light. For example, the measuring light has the spectrum shown in FIG. 11A. The spectroscope 14 acquires spectrums of the light reflected from the surface 13a and from the rear surface 13b of the object to be measured 13. For example, the reflected light has the spectrum shown in FIG. 11B. The spectrum of the reflected light is input to the optical path length calculation unit 16 from the spectroscope 14. When the process of S10 ends, the process goes to a coordinate changing process (S12).

Figure 11C:
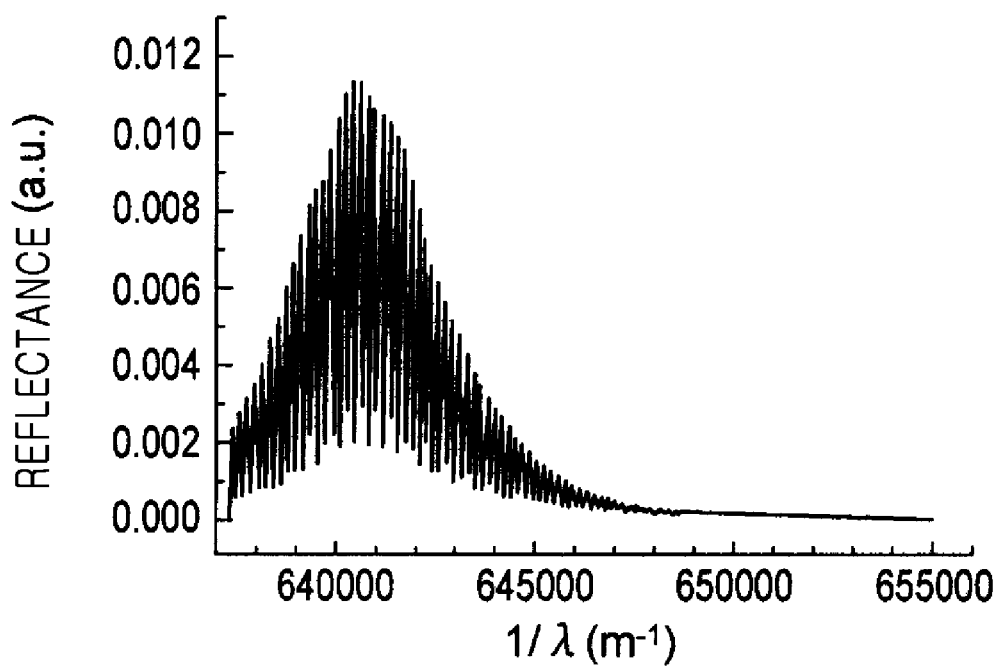

In operation S12, the optical path length calculation unit 16 converts a coordinate axis of the spectrum obtained by the operation S10 to a spatial frequency $1/\lambda$ from a wavelength $\lambda$. For example, the spectrum shown in FIG. 11C is obtained. When the process of operation S12 ends, the process goes to a first data interpolation process (S14).

In operation S14, the optical path length calculation unit 16 performs a data interpolation of the spectrum obtained from the process of S12. For example, the number of samplings is $N_s$, the data is data of the spectrum, spatial frequencies are arranged in an order of $x_0, x^1, x_2, \ldots, x_{N-1}$, and intensities are arranged in an order of $y_0, y_1, y_2, \ldots, y_{N-1}$. First, the optical path length calculation unit 16 rearranges the spatial frequencies at same intervals. For example, when it is assumed that a spatial frequency included in rearranged spatial frequencies is $X_i$, the spatial frequencies are rearranged by using following equation.

$$X_i = x_0 + \frac{x_{N-1} - x_0}{N_s - 1} \cdot l \quad (30)$$

Next, the optical path length calculation unit 16 calculates an intensity of the spatial frequency $X_i$ after the rearrangement by using a linear interpolation. When it is assumed that the intensity at that time is $Y_i$, $Y_i$ is calculated by using following equation.

$$Y_i = \frac{y_{j+1} - y_j}{x_{j+1} - x_j} \cdot (X_i - x_j) \quad (31)$$

Figure 12A:
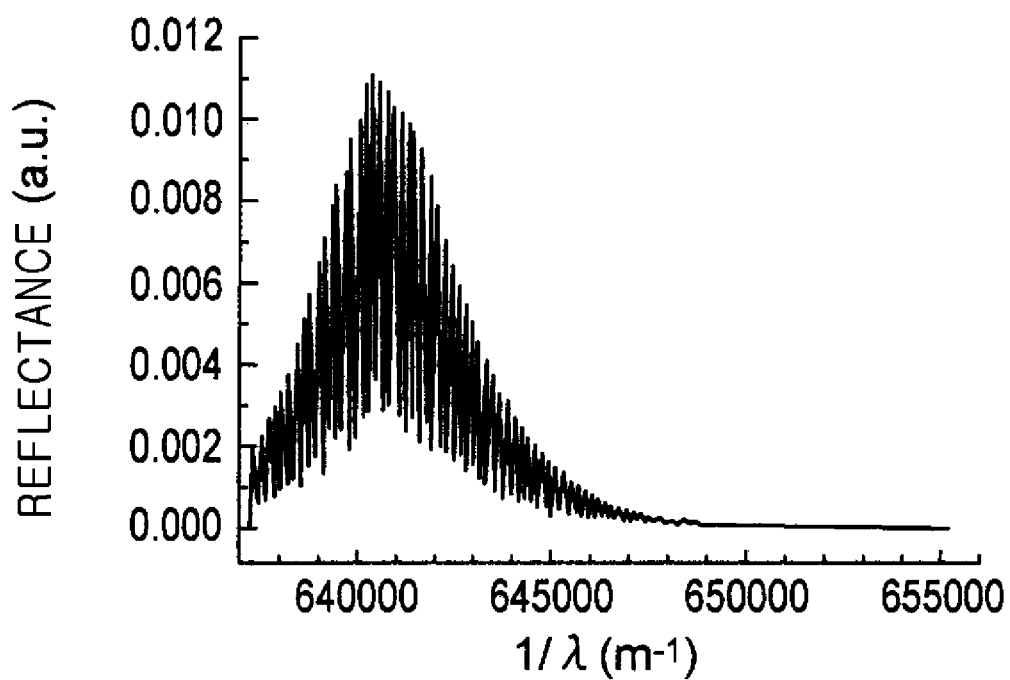

Here, j is a maximum integer satisfying a condition $X_i > X_j$. Accordingly, the spectrum shown in FIG. 12A is obtained. When the process of S14 ends, the process goes to an FFT process (S16).

Figure 12B:
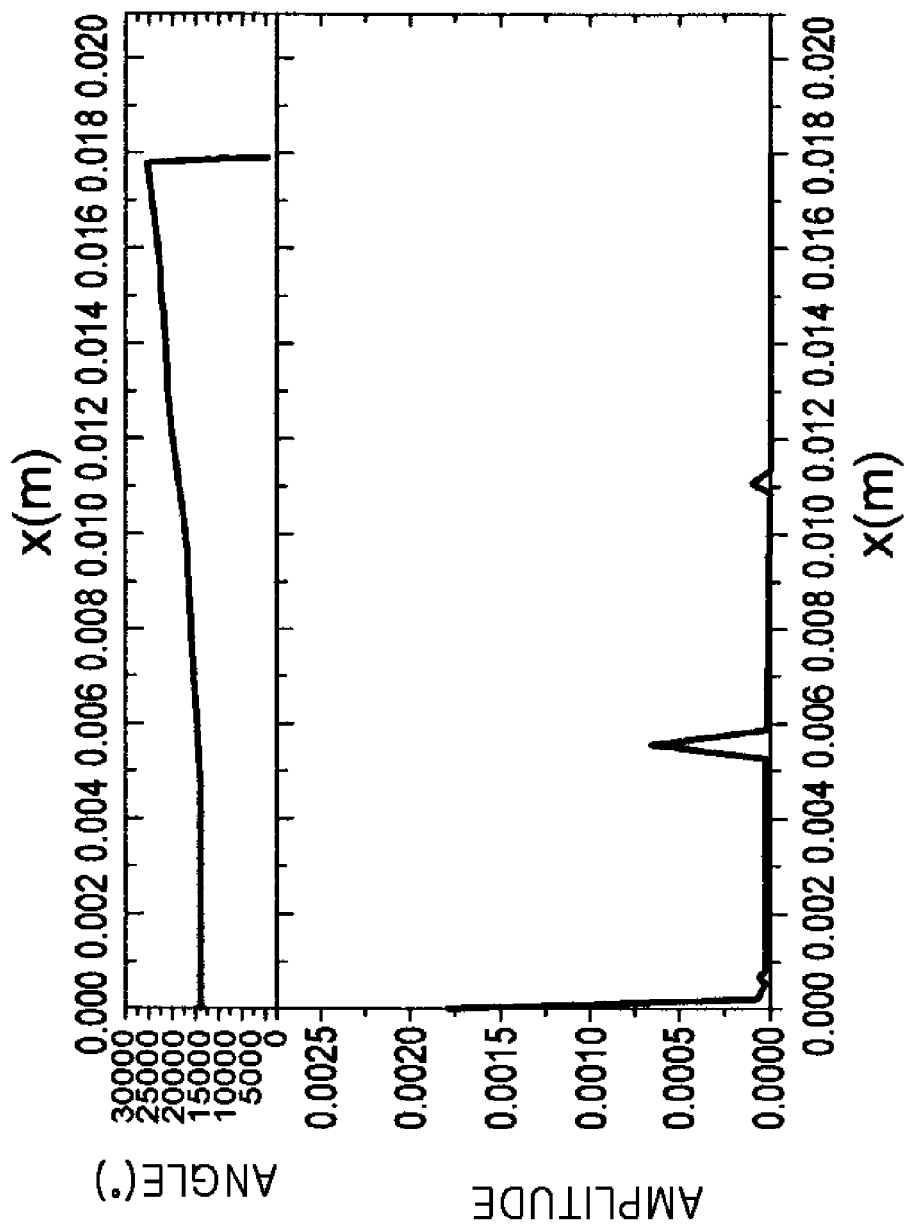

In operation S16, the Fourier transformation unit 17 performs Fourier transformation of the spectrum that is interpolated in the operation S14 (Fourier transformation process). Accordingly, for example, as shown in FIG. 12B, the spectrum having a longitudinal axis denoting an amplitude and a transverse axis denoting a phase is obtained. When the operation S16 ends, the process goes to a filtering process (S18).

In operation S18, the optical path length calculation unit 16 filters a peal value of X=0 from the spectrum obtained by the process performed in the operation S16. For example, 0 is substituted in intensity data Y within a range from X=0 to X=Z (predetermined value). When the process of the operation S18 is finished, the process goes to an extraction process (S20).

Figure 12C:
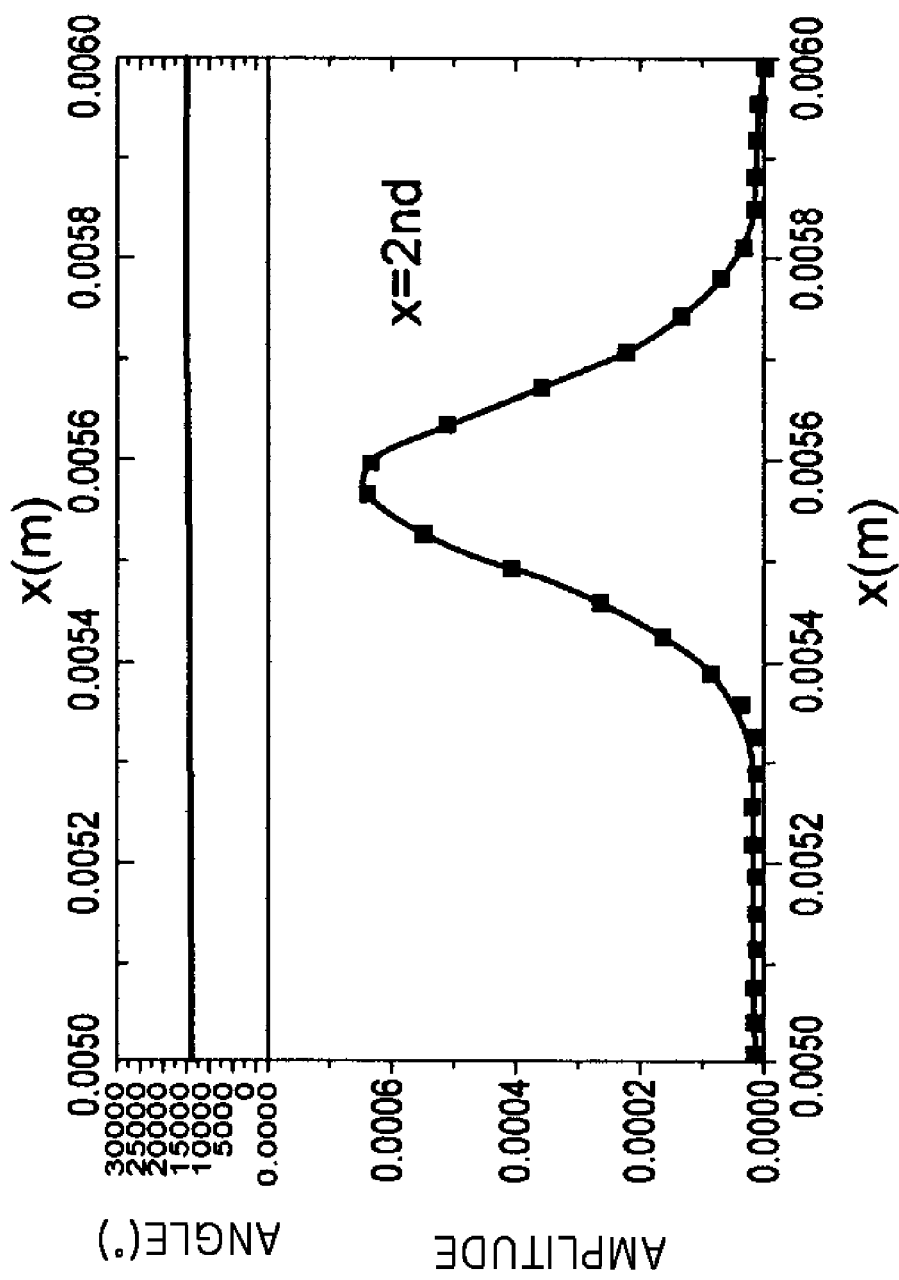

In operation S20, the optical path calculation unit 16 extracts a peak value where X=2nd from the spectrum obtained by the process in the operation S18. For example, when a maximum value of the peak is $Y_i$, twenty data points are extracted from a value $Y_{i-10}$, in order to extract the data from the center to an end of the peak. For example, when the maximum value of the peak is 1, the data points are extracted from a range from the maximum value to 0.5. For example, the spectrum shown in FIG. 12C is extracted. When the process of the operation S20 is finished, the process goes to a second data interpolation process (S22).

In operation S22, the data interpolation unit 18 interpolates data of the peak of 2nd obtained in the process of S20 (data interpolation process). The data interpolation unit 18 linearly interpolates, for example, intervals between the data points at constant intervals by the number of interpolations (N). The number of interpolations $N_A$ is set in advance based on, for example, necessary temperature accuracy.

Here, the number of interpolations $N_A$ is described. For example, when the object to be measured 13 is a Si substrate having a diameter of 300 mm, a peak interval Δ2nd after the FFT is 0.4 μm/° C. Therefore, when an accuracy of 1° C. is necessary, the number of interpolations $N_A$ is set so that the interval between data points becomes 0.4 μm. The number of interpolations $N_A$ may be determined in consideration of a noise level of the system. Here, it is assumed that a wavelength span $\Delta w$ is 42 nm ($\Delta w$=42 nm) and the number of samplings $N_s$ is 640 ($N_s$=640) in the spectroscope 14. In addition, it is assumed that a central wavelength $\lambda_0$ of the light source 10 is 1560 nm ($\lambda_0$=1560 nm). In this case, the data interval after the FFT becomes $\Delta x$=56 nm by using the above equation (8). Therefore, each of the intervals between the points has to be interpolated into 140 points (the number of interpolation $N_A$=140) so that the data interval becomes 0.4 μm. In addition, if the noise level is about 0.1° C., a resolution of 0.1° C. or less is not necessary. In addition, the data interpolation is important in view that the resolution becomes 140°

C. when the data interval Δx is 56 nm (Δx=56 nm). For example, the data interpolation is performed by using following equation.

$$Y_i = (y_{j+1} - y_j) \cdot \frac{X_i - X_j}{X_{j+1} - X_j} \qquad (32)$$

Here, j is an index used to rearrange the intensities. The data interpolation unit 18 executes the above equation 32 within a range of i=0 to N−1. That is, the data interpolation is performed with respect to all of the intervals between the 20 data points obtained from the process of S20. As described above, the data interval after the Fourier transformation is divided into the necessary number (the number of interpolation N), and then, the number of data points according to the number of divisions is linearly interpolated. When the process of S22 is finished, the process goes to an extraction process (S24).

In the operation S24, the center calculation unit 19 only extracts the data range used to calculate the center from the data interpolated in the process of S22. For example, the center calculation unit 19 substitutes 0 to intensity data (Y) that is not more than the maximum intensity ($Y_{MAX} \times A$) of the peak under an assumption that a threshold value used to the center calculation is A %. When the process of S24 is finished, the process goes to a center calculation process (S26).

In the operation S26, the center calculation unit 19 calculates a weight applied center from the data interpolated in the process of the operation S24 (weight applied center calculation process). For example, following equation is used.

$$2 \cdot n \cdot d = \frac{\sum_{i=1}^{N}(Y_i \cdot X_i)}{\sum_{i=1}^{N} Y_i} \qquad (33)$$

In addition, N denotes the number of data points after extracting the central range. The optical path length nd may be calculated by using the above equation (33). When the process of the operation S26 is finished, the process goes to a temperature calculation process (S28).

Figure 13:
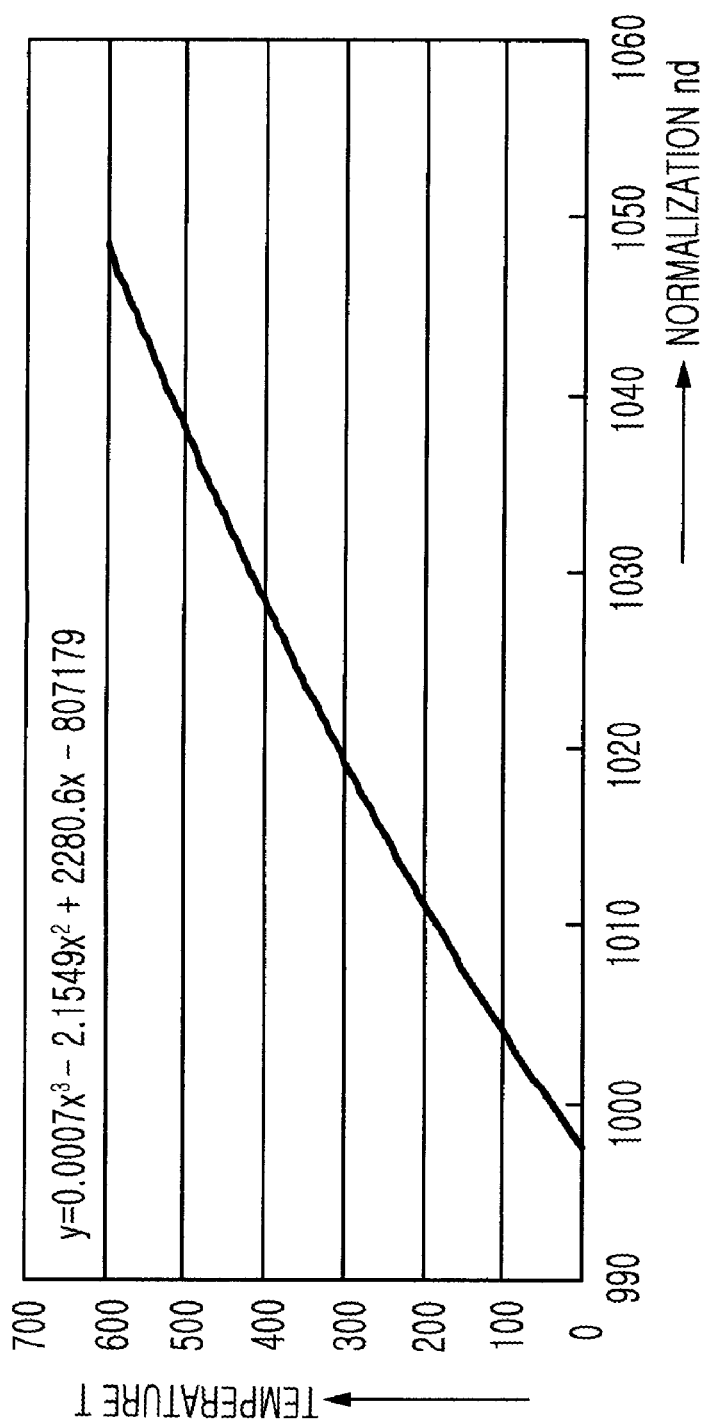
FIG. 13 is a diagram showing an example of temperature correction data.

In the operation S28, the temperature calculation unit 20 calculates a temperature by using the optical path length nd obtained in the process of the operation S26 (temperature calculation process). The temperature calculation unit 20 calculates the temperature by using, for example, temperature correction data 21 shown in FIG. 13. In the graph of FIG. 13, a transverse axis denotes the optical path length nd, and a longitudinal axis denotes the temperature. The temperature correction data 21 is acquired in advance with respect to each object to be measured 13. Hereinafter, an example of generating the temperature correction data 21 in advance will be described. For example, temperatures are actually measured by using a blackbody furnace. Temperatures T and optical path lengths $nd_T$ corresponding to the temperatures T are simultaneously measured. The temperatures T are measured by using a thermometer such as a thermocouple. In addition, the optical path lengths $nd_T$ are measured by using the above described method of using the FFT. Also, the optical path lengths $nd_T$ are normalized under a condition where an optical path length $nd_{40}$ when a measured value of the thermometer is 40° C. is 1000. In addition, the temperature and the normalized optical path length $nd_T$ are approximated at every 100° C. according to a cubic equation to derive a coefficient of an approximate curve. Equation shown on upper left portion of a graph of FIG. 13 is the cubic equation. Also, a function of the normalized optical path lengths $nd_T$ depending on the temperatures T is represented by following equation.

$$f(T) = \frac{n \cdot d_T}{n \cdot d_{40}} \qquad (34)$$

In addition, a reversed function of f(T) is represented by following equation.

$$T = f^{-1}\left(\frac{n \cdot d_T}{n \cdot d_{40}}\right) \qquad (35)$$

The optical path length $nd_{40}$ is calculated by following equation according to both an initial temperature $T_0$ and an optical path length $nd_{T0}$ at that time.

$$n \cdot d_{40} = \frac{n \cdot d_{T0}}{f(T0)} \qquad (36)$$

Based on the optical path length $nd_{40}$ obtained based on the above equation (36) and the optical path length $nd_T$, the temperature T is calculated by using the above equation (35). When the operation S28 ends, the controlling processes shown in FIG. 10 are finished.

As described above, the controlling processes shown in FIG. 10 are finished. By performing the controlling processes of FIG. 10, the temperature can be measured with high accuracy even when there are small amounts of data points. For example, a method of calculating the location x by using an approximation curve of the peak value of 2nd may be suggested. However, according to this method, the signal after the FFT may have an asymmetrical shape based on a center of a peak, from a shape of the light source spectrum 10 or a relation between the wavelength span Δw of the spectroscope 14 and the light source 10. For example, it is rare that the spectrum shape of the light source 10 becomes a symmetrical Gaussian function, and moreover, it is rare that the signal after the FFT becomes a symmetrical Gaussian function. Thus, it is difficult to acquire an accurate peak location according to the method of using the approximation curve. However, in the data interpolation process shown in FIG. 10, the linear interpolation is performed, and thus, the center location can be determined without depending upon a signal profile after the FFT. In addition, since the data points can be interpolated according to the temperature accuracy, the temperature measurement may be performed accurately and stably.

As described above, according to the temperature measuring system 1 and the temperature measuring method of the present embodiment, the data interval ΔX after the Fourier transformation and the maximum measurable thickness d are defined, and accordingly, the light source 10 and the spectroscope 14 having specifications required to perform the temperature measurement with a desired accuracy are configured. That is, by preparing the light source 10 satisfying the conditions based on the wavelength span Δw and the spectroscope 14 satisfying the conditions based on the wavelength span Δw and the maximum measurable thickness d, the temperature can be measured appropriately by using the optical interference.

The above described embodiments are examples of the temperature measuring system and the temperature measuring method, and the apparatus and method of the present invention may be modified or applied to other operations.

Figure 14:
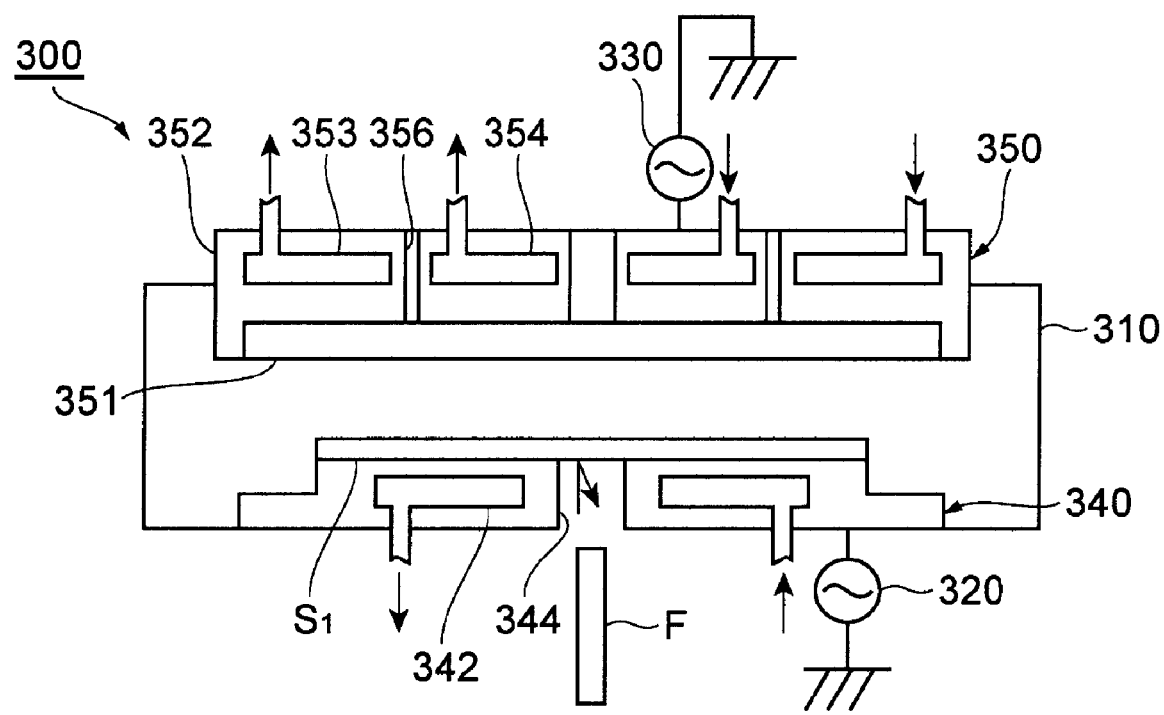
FIG. 14 is a diagram showing an example of a substrate processing apparatus according to an embodiment of the present invention.

For example, the temperature measuring system 1 according to the embodiment of the present invention may be mounted in a substrate processing apparatus. FIG. 14 shows an example of the substrate processing apparatus. Herein, for example, a case of applying the temperature measuring system 1 to measure a temperature of a wafer (substrate) Tw, that is, an example of the object to be measured 13, in the substrate processing apparatus, for example, a plasma etching apparatus, will be described.

The light source 10 for generating the measuring light may irradiate light that may be transmitted through and reflected by opposite end surfaces $S_1$ and $S_2$ of the wafer Tw, that is, the object to be measured 13, wherein the light may be reciprocally reflected at least twice from the opposite surfaces $S_1$ and $S_2$ of the wafer Tw. For example, since the wafer Tw is formed of silicon, the light source 10 may irradiate light having a wavelength of about 1.0 to 2.5 μm, which can transmit through a silicon material such as silicon, a silicon oxide film, and the like.

As shown in FIG. 14, a substrate processing apparatus 300 includes a processing chamber 310, in which a predetermined process such as an etching process or a film forming process is performed on the wafer Tw, for example. That is, the wafer Tw is accommodated in the processing chamber 310. The processing chamber 310 is connected to an exhaust pump (not shown) to be vacuum exhausted. In the processing chamber 310, an upper electrode 350 and a lower electrode 340 facing the upper electrode 350 are provided. The lower electrode 340 also functions as a holding stage on which the wafer Tw is placed. An electrostatic chuck (not shown) for electrostatically holding, for example, the wafer Tw is provided on an upper portion of the lower electrode 340. In addition, a cooling unit is provided in the lower electrode 340. The cooling unit controls, for example, a temperature of the lower electrode 340 by circulating a coolant in a coolant flow path 342 formed roughly as a loop in the lower electrode 340. Accordingly, a temperature of the wafer Tw is controlled. The wafer Tw is carried in the processing chamber 310 from, for example, a gate valve (not shown) provided on a side surface of the processing chamber 310. Radio frequency power sources 320 and 330 applying predetermined radio frequency power are respectively connected to the lower electrode 340 and the upper electrode 350.

The upper electrode 350 is configured to support an electrode plate 351 that is located at a lowermost portion by using an electrode supporter 352. The electrode plate 351 is formed of, for example, a silicon material (silicon, silicon oxide, and the like), and the electrode supporter 352 is formed of, for example, aluminum. An inlet port (not shown) through which a predetermined processing gas is induced is provided on an upper portion of the upper electrode 350. A plurality of ejection holes (not shown) are formed in the electrode plate 351 so that the processing gas induced from the inlet port can be evenly ejected toward the wafer Tw placed on the lower electrode 340.

A cooling unit is provided in the upper electrode 350. The cooling unit controls a temperature of the upper electrode 350, for example, by circulating a coolant in a coolant flow path formed in the electrode supporter 352 of the upper electrode 350. The coolant flow path is formed roughly as a loop shape, and is divided into two systems, for example, an outer coolant flow path 353 for cooling an outer side of a surface of the upper electrode 350, and an inner coolant flow path 354 for cooling an inner side of the surface of the upper electrode 350. Each of the outer coolant flow path 353 and the inner coolant flow path 354 is configured so that the coolant is circulated, that is, supplied from a supply port, circulated in each of the coolant flow paths 353 and 354, and is discharged from a discharge port and returned to an external freezer (not shown), as denoted by an arrow of FIG. 5. The same coolant or different coolants may be circulated in the two systems of coolant flow paths. In addition, the present invention is not limited to the two coolant flow path systems shown in FIG. 5, for example, only one coolant flow path system may be provided or one coolant flow path system dividing into two branches may be provided.

In the electrode supporter 352, a low heat transfer layer 356 is formed between an outer portion in which the outer coolant flow path 353 is formed and an inner portion in which the inner coolant flow path 354 is formed. Accordingly, it is difficult to transfer heat between the outer portion and the inner portion of the electrode supporter 352 due to the low heat transfer layer 356, and thus it is possible to control temperatures of the outer portion and the inner portion to be different from each other by controlling the coolant in the outer coolant flow path 353 and the inner coolant flow path 354. As such, a temperature at the surface of the upper electrode 350 can be efficiently and precisely controlled.

In the substrate processing apparatus 300, the wafer Tw is carried in the processing chamber 310 through a gate valve by, for example, a transfer arm or the like. The wafer Tw carried in the processing chamber 310 is placed on the lower electrode 340, radio frequency power is applied to the upper electrode 350 and the lower electrode 340, and a predetermined processing gas is induced in the processing chamber 310 from the upper electrode 350. Accordingly, the processing gas induced from the upper electrode 350 becomes plasma, and an etching process, for example, is performed on a surface of the wafer Tw.

The reference light of the temperature measuring system 1 is configured to be transmitted to a measuring light irradiation position on which the measuring light is irradiated toward the wafer Tw, that is, the object to be measured, from the lower electrode 340, via optical fibers F formed in the collimator 12. In more detail, the optical fiber F is provided so that the measuring light can be irradiated toward the wafer Tw via a through-hole 344 formed in the lower electrode 340, for example, a center portion of the lower electrode 340. A location in a direction in surface of the wafer Tw, where the optical fiber F is provided, may not be the center portion of the wafer Tw shown in FIG. 5, provided that the measuring light is irradiated toward the wafer Tw. For example, the optical fiber F may be provided so that the measuring light is irradiated to an end portion of the wafer Tw.

As described above, by mounting the temperature measuring system 1 in the substrate processing apparatus 300, the temperature of the wafer Tw, that is, the object to be measured, during the etching process can be measured. In addition, the above described initial temperature $T_o$ is measured when the wafer Tw is electrostatically held by the lower electrode 340 and a pressure of the predetermined process gas is stabilized. For example, a thermocouple is mounted on the lower electrode 340, and the temperature of the lower electrode 340 is set as the temperature of the wafer Tw and the optical path length nd at this time may be set as an initial length. In addition, a contact type thermometer may be formed on the lower electrode 340 to measure the temperature when transferring the wafer Tw. Also, an example of measuring the temperature of the wafer is described herein; however, if parts such as the upper electrode 350 or a focus ring in the chamber are formed of a material that may transmit the measuring light, a temperature of the corresponding part in the chamber 310 may be measured. In this case, the parts of the chamber 310 may be formed of silicon, quartz, sapphire, or the like.

Also, in the above described embodiment, the number of samplings is described as the number of light receiving devices in the CCD; however, the number of samplings and the number of light receiving devices may be separately defined according to a kind of the spectroscope 14. For example, the spectroscope 14 may include one light receiving device and a tunable filter that is a wavelength selecting filter, and may acquire the spectrum of reflected light by scanning a range including a central wavelength of the peak value. In this case, the number of samplings may be predicted based on the number of measuring steps performed by the wavelength selecting filter and the light receiving device.

In addition, in the above embodiment, the optical circulator 11 is provided; however, 2×1 or 2×2 photo couplers may be formed. When using the 2×2 photo couplers, a reference mirror may not be provided.

As described above, according to aspects and embodiments of the present invention, the temperature measuring system capable of measuring a temperature by using optical interference, the substrate processing apparatus, and the temperature measuring method are provided.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A temperature measuring system for measuring a temperature of an object having a first main surface and a second main surface facing the first main surface, the temperature measuring system comprising:
a light source which generates measuring light having a wavelength transmittable through the object;
a spectroscope which measures an intensity distribution depending on a wavelength or a frequency;
an optical transfer mechanism which is connected to the light source and the spectroscope to emit the measuring light from the light source to the first main surface of the object and emit light reflected from the first main surface and the second main surface to the spectroscope;
an optical path length calculation unit which calculates a length of an optical path by Fourier transforming an interference intensity distribution that is an intensity distribution of the reflected light from the first main surface and the second main surface measured by the spectroscope; and
a temperature calculation unit which calculates the temperature of the object based on the optical path length calculated by the optical path length calculation unit and a relation between optical path lengths and temperatures of the object, which are measured in advance,
wherein the light source is configured to have a half-width at half-maximum of a light source spectrum which is determined based on a wavelength span of the spectroscope, and
the spectroscope is configured to measure the intensity distribution by using number of samplings which is determined based on the wavelength span of the spectroscope and a maximum thickness of the object to be measured by the temperature measuring system,
wherein the light source is configured to have a light source spectrum satisfying following equation, $$\Delta\lambda < \frac{2 \cdot \ln 2 \cdot \Delta w}{3\pi}$$

where $\Delta w$ denotes the wavelength span, and $\Delta\lambda$ denotes a half-width at half-maximum of the light source spectrum, and
wherein the spectroscope is configured to measure the intensity distribution by using the number of samplings, which satisfies following equation, $$N_s > \frac{4 \cdot n \cdot d \cdot \Delta w}{\lambda_0^2}$$

where $\lambda_0$ denotes a central wavelength of the light source, $\Delta w$ denotes the wavelength span, n denotes a refractive index of the object, d denotes a maximum thickness of the object to be measured by the temperature measuring system, and $N_s$ denotes the number of samplings.

2. The temperature measuring system of claim 1, wherein the spectroscope comprises:
a light-scattering device which scatters the reflected light at every wavelength; and
a light receiving device which detects the scattered light by the light-scattering device,
the wavelength span is defined based on a dispersion angle of the light-scattering device and a distance between the light-scattering device and the light receiving device.

3. The temperature measuring system of claim 1, wherein the spectroscope comprises a light receiving unit in which a plurality of light receiving devices are arranged, and the number of samplings is defined based on the number of light receiving devices.

4. The temperature measuring system of claim 1, wherein the object is formed of silicon, quartz, or sapphire.

5. The temperature measuring system of claim 1, wherein the optical path length calculation unit comprises:
a Fourier transformation unit which calculates an intensity distribution according to an optical path length by Fourier transforming the interference intensity distribution;
a data interpolation unit which divides a data interval after the Fourier transformation into a number of divisions that is defined by a predetermined temperature accuracy, and linearly interpolates the number of pieces of data according to the number of divisions; and
a center calculation unit which calculates an optical path length by calculating a weight applied center by using the data interpolated by the data interpolation unit.

6. A substrate processing apparatus for performing a predetermined process on a substrate having a first main surface and a second main surface facing the first main surface and measuring a temperature of the substrate, the substrate processing apparatus comprising:
a processing chamber which is configured to be vacuum exhausted and to accommodate the substrate;
a light source which generates measuring light having a wavelength transmittable through the substrate;
a spectroscope which measures an intensity distribution depending on a wavelength or a frequency;
an optical transfer mechanism which is connected to the light source and the spectroscope to emit the measuring light from the light source to the first main surface of the substrate and emit light reflected from the first main surface and the second main surface to the spectroscope;

an optical path length calculation unit which calculates a length of an optical path by Fourier transforming an interference intensity distribution that is an intensity distribution of the reflected light from the first main surface and the second main surface measured by the spectroscope; and a temperature calculation unit which calculates the temperature of the substrate based on the optical path length calculated by the optical path length calculation unit and a relation between optical path lengths and temperatures of the substrate, which are measured in advance, wherein the light source is configured to have a half-width at half-maximum of a light source spectrum which is determined based on a wavelength span of the spectroscope, and the spectroscope is configured to measure the intensity distribution by using number of samplings which is determined based on the wavelength span of the spectroscope and a maximum thickness of the substrate, wherein the light source is configured to have a light spectrum satisfying following equation, $$\Delta\lambda < \frac{2 \cdot \ln 2 \cdot \Delta w}{3\pi}$$

where $\Delta w$ denotes the wavelength span, and $\Delta\lambda$ denotes a half-width at half-maximum of the light source spectrum, and wherein the spectroscope is configured to measure the intensity distribution by using the number of samplings, which satisfies following equation, $$N_s > \frac{4 \cdot n \cdot d \cdot \Delta w}{\lambda_0^2}$$

where $\lambda_0$ denotes a central wavelength of the light source, $\Delta w$ denotes the wavelength span, n denotes a refractive index of the object, d denotes a maximum thickness of the object to be measured by the temperature measuring system, and $N_s$ denotes the number of samplings.

7. A temperature measuring method for measuring a temperature of an object having a first main surface and a second main surface facing the first main surface by using a temperature measuring system of claim 1, the temperature measuring method comprising:

a process of generating a measuring light by the light source;

a process of, by the optical transfer mechanism, emitting the measuring light to the first main surface and acquiring a reflected light from the first main surface and the second main surface;

a process of receiving the reflected light by the spectroscope;

a Fourier transformation process for calculating, by the optical path length calculation unit, an intensity distribution according to an optical path length by Fourier transforming an interference intensity distribution that is an intensity distribution of the reflected light;

a data interpolation process for dividing, by the optical path length calculation unit, a data interval after the Fourier transformation into a number of divisions defined by a predetermined temperature accuracy, and linearly interpolating a number of pieces of data according to the number of divisions;

a center calculation process for calculating, by the optical path length calculation unit, an optical path length by calculating a weight applied center by using the data interpolated in the data interpolation process; and a temperature calculation process for calculating, by the temperature calculation unit, a temperature of the object based on the optical path length calculated in the center calculation process and a relation between optical path lengths and temperatures of the object, which are measured in advance.

* * * * *